US012059380B1

(12) United States Patent
Dean et al.

(10) Patent No.: US 12,059,380 B1
(45) Date of Patent: Aug. 13, 2024

(54) SYSTEMS AND METHODS TO UPGRADE A MOTORIZED MOBILE CHAIR TO A SMART MOTORIZED MOBILE CHAIR

(71) Applicant: Luci Mobility, Inc., Brentwood, TN (US)

(72) Inventors: Jered H. Dean, Arvada, CO (US); Dan A. Preston, Bainbridge Island, WA (US); Kenneth Schofield, Holland, MI (US); Kevin J. Lannen, Denver, CO (US); Karl A. Grueschow, Commerce City, CO (US)

(73) Assignee: Luci Mobility, Inc., Brentwood, TN (US)

( * ) Notice: Subject to any disclaimer, the term of this patent is extended or adjusted under 35 U.S.C. 154(b) by 0 days.

(21) Appl. No.: 18/218,935

(22) Filed: Jul. 6, 2023

Related U.S. Application Data

(63) Continuation of application No. 16/858,704, filed on Apr. 26, 2020, now Pat. No. 11,730,645.

(Continued)

(51) Int. Cl.
*A61G 5/04* (2013.01)
*A61G 5/10* (2006.01)

(52) U.S. Cl.
CPC ................. *A61G 5/04* (2013.01); *A61G 5/10* (2013.01); *A61G 2203/30* (2013.01); *A61G 2203/72* (2013.01)

(58) Field of Classification Search
CPC ........ A61G 5/04; A61G 5/10; A61G 2203/30; A61G 2203/72
See application file for complete search history.

(56) References Cited

U.S. PATENT DOCUMENTS 8,065,051 B2 * 11/2011 Chopcinski .......... G05B 19/106 701/1
9,016,410 B2 * 4/2015 Trowell .............. B60L 15/2036 701/41

(Continued)

FOREIGN PATENT DOCUMENTS

AU 2016201588 A1 * 3/2016 ............... A61G 5/04

OTHER PUBLICATIONS

Simpson et al., The Hephaestus Smart Wheelchair System, Jun. 2002, IEEE Transactions on Neural Systems and Rehabilitation Engineering, vol. 10, No. 2, p. 118-122 (Year: 2002).*

(Continued)

*Primary Examiner* — Steve Clemmons
(74) *Attorney, Agent, or Firm* — Polsinelli PC; Derek D. Donahoe

(57) ABSTRACT

An upgrade system upgrades a motorized mobile chair to a smart motorized mobile chair. The motorized mobile chair has a processing system comprising at least two processors. The upgrade system comprises a plurality of object detection sensors and at least one processing unit connected between at least a first one of the at least two processors of the processing system and at least a second one of the at least two processors of the processing system. The processing unit receives sensor data from at least one of the plurality of object detection sensors, receives at least one control signal transmitted from the first processor, the control signal comprising data, modifies or does not modify the data of the control signal based on at least the sensor data, and transmits the modified or not modified control signal, the transmitted control signal to be received by the second processor.

37 Claims, 17 Drawing Sheets

Related U.S. Application Data

(60) Provisional application No. 62/839,307, filed on Apr. 26, 2019.

(56) References Cited

U.S. PATENT DOCUMENTS

| | | | | |
|---|---|---|---|---|
| 9,499,069 | B2 * | 11/2016 | Hyde | A61G 5/04 |
| 10,656,652 | B2 * | 5/2020 | Dean | G05D 1/247 |
| 10,802,495 | B2 * | 10/2020 | Peret | B60L 15/10 |
| 10,926,756 | B2 * | 2/2021 | Dastous | B60T 7/102 |
| 11,075,910 | B2 * | 7/2021 | Dean | H04L 63/0892 |
| 11,154,442 | B1 * | 10/2021 | Dean | A61G 5/1051 |
| 2002/0121394 | A1 * | 9/2002 | Kamen | G05B 13/042 180/41 |
| 2008/0294300 | A1 * | 11/2008 | Ashmore | G06F 3/012 700/303 |
| 2014/0018994 | A1 * | 1/2014 | Panzarella | G05D 1/0248 701/25 |
| 2017/0095382 | A1 * | 4/2017 | Wen | A61G 5/04 |
| 2017/0266069 | A1 * | 9/2017 | Lozano | A61G 5/04 |
| 2018/0224853 | A1 * | 8/2018 | Izhikevich | G01C 21/005 |
| 2018/0256422 | A1 * | 9/2018 | Leaman | A61G 5/04 |
| 2019/0049968 | A1 * | 2/2019 | Dean | G06V 20/58 |
| 2020/0137099 | A1 * | 4/2020 | Haga | B60R 16/023 |

OTHER PUBLICATIONS

Simpson et al., The Smart Wheelchair Component System, May/Jun. 2004, Journal of Rehabilitation Research & Development, vol. 41, No. 3B, p. 429-442 (Year: 2004).*

* cited by examiner

SYSTEMS AND METHODS TO UPGRADE A MOTORIZED MOBILE CHAIR TO A SMART MOTORIZED MOBILE CHAIR

COPYRIGHT NOTICE

Contained herein is material that is subject to copyright protection. The copyright owner has no objection to the facsimile reproduction by anyone of the patent document or the patent disclosure, as it appears in the United States Patent and Trademark Office patent file or records, but otherwise reserves all rights to the copyright whatsoever. The following notice applies to the software, screenshots and data as described below and in the drawings hereto and All Rights Reserved.

RELATED APPLICATIONS

The present application is a continuation of U.S. patent application Ser. No. 16/858,704 filed Apr. 26, 2020 entitled "Systems and Methods to Upgrade a Motorized Mobile Chair to a Smart Motorized Mobile Chair," which claims benefit of priority under 35 U.S.C. § 119 (e) from U.S. Patent App. No. 62/839,307 filed Apr. 26, 2019 entitled "Systems and Methods to Upgrade a Motorized Mobile Chair to a Smart Motorized Mobile Chair," all of which are incorporated herein by reference in their entirety.

The present application is related to U.S. Patent App. No. 62/543,896 filed Aug. 10, 2017 entitled "Systems and Methods for Motorized Mobile Systems," U.S. Patent App. No. 62/612,617 filed Dec. 31, 2017 entitled "Systems and Methods for Enhanced Autonomous Operations of a Motorized Mobile System," U.S. Patent App. No. 62/639,293 filed Mar. 6, 2018 entitled "Systems and Methods for Enhanced Autonomous Operations of a Motorized Mobile System," and U.S. Patent App. No. 62/696,497 filed Jul. 11, 2018 entitled "Systems and Methods for Enhanced Autonomous Operations of a Motorized Mobile System," all of which are incorporated herein by reference in their entirety.

The present application also is related to U.S. patent application Ser. No. 15/880,663 filed Jan. 26, 2018 (now U.S. Pat. No. 11,075,910) entitled "Secure Systems Architecture for Integrated Motorized Mobile Systems," U.S. patent application Ser. No. 15/880,686 filed Jan. 26, 2018 (now U.S. Pat. No. 11,154,442) entitled "Federated Sensor Array for Use with a Motorized Mobile System and Method of Use," U.S. patent application Ser. No. 15/880,699 filed Jan. 26, 2018 (now U.S. Pat. No. 10,656,652) entitled "System and Methods for Sensor Integration in Support of Situational Awareness for a Motorized Mobile System," and U.S. patent application Ser. No. 16/101,152 filed Aug. 10, 2018 (now U.S. Pat. No. 11,334,070) entitled "Systems and Methods for Enhanced Autonomous Operations of a Motorized Mobile System," all of which are incorporated herein by reference in their entirety.

FIELD

This disclosure relates generally to control systems and sensor systems for motorized mobile systems.

BACKGROUND

Drive-by-wire (DbW), steer-by-wire, or x-by-wire technology is the use of electrical or electro-mechanical systems for performing vehicle functions traditionally achieved by mechanical linkages. This technology replaces traditional mechanical control systems with electronic control systems using electromechanical actuators and human-machine interfaces. The technology is similar to the fly-by-wire systems used in the aviation industry. Use of these "by-wire" systems began with manned aircraft, migrated to drones, as well as marine and rail operations, and are now being used in autonomous or self-driving vehicle applications. These once expensive technologies are emerging in the market as commodity products, including products with sensors, processors, integrated mobile devices, and various communication mediums, including bandwidth increases for soon to be $5^{th}$ generation (5G) wireless devices on 5G networks.

Application of such "by-wire" systems may help create safe, secure independence and a richer experience for all motorized mobile chair users. As an example of the need for improved MMSs, consider that today, with the advances in robotics and systems of systems integration, as well as medical advances that allow device integration with the human nervous system, there is a widening split between motorized mobile chair users with varying physiological functionality. Some mobile chair users may have significant remaining upper body mobility and cognitive function. An example of this would be a person who does not have the use of their legs and who uses a manual mobile chair for mobility, but is otherwise able to navigate day-to-day life with minimal to no assistance. Such an individual may be able to adapt to an artificial limb, such as a leg, or an exoskeleton and reasonably be able to go about their day to day life with few restrictions. However, another example would be a user with certain health issues that greatly impacts the user's mobility and/or cognition. It is unlikely that these users will benefit from the same artificial leg or exoskeleton technologies due to their physiological condition. These users may use a motorized mobile chair.

Many mobile chair users report they are frequently frustrated by the general public's poor understanding of their abilities and needs. In general, the mobile chair is an extension of a user's body. People who use them have different disabilities and varying abilities. Some can use their arms and hands, while others can get out of their mobile chairs and walk for short distances. "Disability" is a general, medical term used for a functional limitation that interferes with a person's ability to walk, hear, learn, or utilize other physiological and/or cognitive functions of the body.

Conditions like cerebral palsy can be a sub-set of either physiological or cognitive disabilities since there are a number of sub-types classified based on specific ailments they present, resulting in varying degrees of ability. For example, those with stiff muscles have what is medically defined as spastic cerebral palsy, those with poor coordination have ataxic cerebral palsy, and those with writhing movements have athetoid cerebral palsy, each type requiring individual mobility plans.

What is needed is an evolution of existing mobile systems that consider the users' abilities, needs, and health, with the goal of a safe, secure, and social independence. Systems and methods are disclosed herein to fulfill these and other needs.

SUMMARY

An upgrade system upgrades a motorized mobile chair to a smart motorized mobile chair. The motorized mobile chair has a processing system comprising at least two processors. The upgrade system comprises a plurality of object detection sensors and at least one processing unit connected between at least a first one of the at least two processors of the processing system and at least a second one of the at least two processors of the processing system. The processing unit receives sensor data from at least one of the plurality of object detection sensors, receives at least one control signal transmitted from the first processor, the control signal comprising data, modifies or does not modify the data of the control signal based on at least the sensor data, and transmits the modified or not modified control signal, the transmitted control signal to be received by the second processor.

Following are a few definitions used in this disclosure.

Automobiles: passenger cars, trucks, passenger buses, and other passenger or property transporting motorized vehicles intended for licensed operation on state and national highways.

Caregiver: an individual that assists an MMS user. Family, friends, aides, nurses, and other health care workers may all be included in this category. The term "Attendant" is used synonymously with the term caregiver.

Mobility disability: a condition for a person who uses a mobile chair or other MMS to assist in mobility.

Motorized Mobile System (MMS): a non-automobile motorized device which provides powered mobility to one or more users, including such systems as motorized mobile chairs, mobility scooters, electronic conveyance vehicles, riding lawn mowers, grocery carts, all-terrain vehicles (ATVs), golf carts, and other recreational and/or medical mobility systems, but excludes automobiles (passenger cars, trucks, passenger buses, and other passenger or property transporting motorized vehicles intended for licensed operation on state and national highways).

Operator: an individual who operates an MMS, including manual, local, and remote operation.

Person with disabilities: a person having one or more functional limitations that interferes with that person's physiological and/or cognitive functions, including physical, cognitive, and/or sensory conditions.

Technician: one or more of those individuals who setup, service, modify, or otherwise work technically on an MMS. These individuals may be formally licensed or may include operators and caregivers who are comfortable working with the Motorized Mobile System.

User: a person who uses an MMS. A "user" of a mobile chair is referred to herein as a "mobile chair user".

Rehabilitation engineering is the systematic application of engineering sciences to design, develop, adapt, test, evaluate, apply, and/or distribute (and subsets and combinations thereof) technological solutions to problems confronted by persons with disabilities. Current practitioners of rehabilitation engineering are often forced to work with limited information and make long term decisions about the technologies to be used by an individual on the basis of a single evaluation; a snapshot in time. Under current best-case conditions, rehabilitation engineering practitioners work closely in a long-term relationship with their clients to follow-up and readjust assistive technology systems on a regular basis. However, even in these situations, they are often working with limited information and only at periodic intervals.

If it is believed that any material incorporated by reference herein constitutes "essential material" within the meaning of 37 CFR 1.57(d)(1)-(3), applicant(s) reserve the right to amend the specification to expressly recite the essential material that is incorporated by reference as allowed by the applicable rules.

Aspects and applications presented here are described below in the drawings and detailed description. Unless specifically noted, it is intended that the words and phrases in the specification and the claims be given their plain and ordinary meaning to those of ordinary skill in the applicable arts. The inventors are aware that they can be their own lexicographers if desired. The inventors expressly elect, as their own lexicographers, to use only the plain and ordinary meaning of terms in the specification and claims unless they clearly state otherwise and expressly set forth the "special" definition of that term. Absent such clear statements of intent to apply a "special" definition, it is the inventors' intent and desire that the plain and ordinary meaning to the terms be applied to the interpretation of the specification and claims.

Further, the inventors are informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f) to define the systems, methods, processes, and/or apparatuses disclosed herein. To the contrary, if the provisions of 35 U.S.C. § 112(f) are sought to be invoked to define the embodiments, the claims will specifically and expressly state the exact phrases "means for" or "step for" and will also recite the word "function" (i.e., will state "means for performing the function of . . . "), without also reciting in such phrases any structure, material, or act in support of the function. Thus, even when the claims recite a "means for performing the function of . . . " or "step for performing the function of . . . ", if the claims also recite any structure, material, or acts in support of that means or step then it is the clear intention of the inventors not to invoke the provisions of 35 U.S.C. § 112(f). Moreover, even if the provisions of 35 U.S.C. § 112(f) are invoked to define the claimed embodiments, it is intended that the embodiments not be limited only to the specific structures, materials, or acts that are described in the preferred embodiments, but in addition, include any and all structures, materials, or acts that perform the claimed function as described in alternative embodiments or forms, or that are well known present or later-developed equivalent structures, materials, or acts for performing the claimed function.

BRIEF DESCRIPTION OF THE DRAWINGS

A more complete understanding of the systems, methods, processes, and/or apparatuses disclosed herein may be derived by referring to the detailed description when considered in connection with the following illustrative figures. In the figures, like-reference numbers refer to like-elements or acts throughout the figures.

Figure 1:
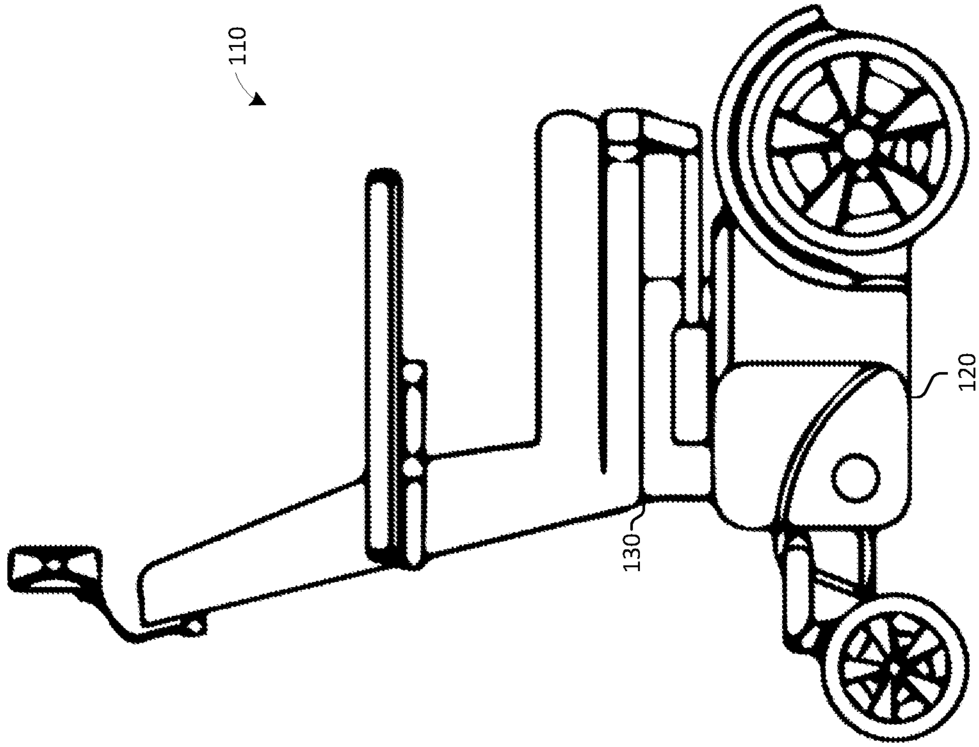
FIG. 1 depicts an embodiment of a front wheel drive motorized mobile chair.

Elements and acts in the figures are illustrated for simplicity and have not necessarily been rendered according to any particular sequence or embodiment.

DETAILED DESCRIPTION

In the following description, and for the purposes of explanation, numerous specific details, process durations, and/or specific formula values are set forth in order to provide a thorough understanding of the various aspects of exemplary embodiments. However, it will be understood by those skilled in the relevant arts that the apparatus, systems, and methods herein may be practiced without all of these specific details, process durations, and/or specific formula values. Other embodiments may be utilized and structural and functional changes may be made without departing from the scope of the apparatus, systems, and methods herein. It should be noted that there are different and alternative configurations, devices, and technologies to which the disclosed embodiments may be applied.

In the following examples of the illustrated embodiments, references are made to the accompanying drawings which form a part hereof, and in which is shown by way of illustration various embodiments in which the systems, methods, processes, and/or apparatuses disclosed herein may be practiced. It is to be understood that other embodiments may be utilized and structural and functional changes may be made without departing from the scope.

Motorized mobile chair users have a variety of different abilities and needs, including based on particular diseases that affect them. Users who have progressive diseases such as ataxia, ALS, or multiple sclerosis typically lose abilities over time and may need more assistance with maneuvering a motorized mobile chair as their condition worsens. Additionally, these users typically need additional health monitoring over time. Inversely, users such as children may require less assistance over time as they mature and become more comfortable driving their motorized mobile chair. Current motorized mobile chair manufacturers (original equipment manufacturers or OEMs) lack the skills and background to develop the advance electronics, sensor systems, software, and communications systems necessary to make motorized mobile chairs responsive to users' changing needs. Instead, based on a predisposition for mechanical systems, current motorized mobile chair manufacturers focus on the adjustability and actuation of the mechanical seating assembly. An upgrade system is needed to upgrade motorized mobile chairs and support the needs of motorized mobile chair users in the real world.

Embodiments of the present disclosure provide systems and methods to upgrade a motorized mobile chair to a smart motorized mobile chair. The ability to add advanced electronics, sensor systems, software, and communications systems as an upgrade system to original equipment manufacturer (OEM) motorized mobile chairs enables OEM's to outsource the development activities to a third party. Moreover, the upgrade system enables OEM motorized mobile chairs to be customized with additional electronics and software at the point of delivery, which improves responsiveness to individual customer needs and specifications, simplifies and improves the performance of testing and calibration procedures, and provides a field executable method for customization, upgrade, retrofit, or replacement of motorized mobile chair components. This on-site, individual customization fits with the distribution model of the industry where the seating assembly is mechanically configured at the point of sale or delivery by a technician. Now, the electrical and software capabilities of the motorized mobile chair can also be upgraded to a smart motorized mobile chair and appropriately configured and individualized to the needs of a specific user. As an additional advantage, the upgrade system enables for the alignment, calibration, and performance testing of the upgrade system independently of the motorized mobile chair. Since a technician no longer needs to align, calibrate, or determine the performance of the upgrade system, it simplifies installation procedures.

Referring generally to FIGS. 1-15, upgrade systems, methods, and apparatuses for providing safety and independence for smart motorized mobile chair users are illustrated. The upgrade systems and methods upgrade non-automobile motorized devices which provide powered mobility to one or more users, including such systems as motorized mobile chairs, mobility scooters, electronic conveyance vehicles, riding lawn mowers, grocery carts, all-terrain vehicles (ATVs), golf carts, and other recreational and/or medical mobility systems, but excludes automobiles (passenger cars, trucks, passenger buses, and other passenger or property transporting motorized vehicles intended for licensed operation on state and national highways). The upgrade systems and methods also support stand-alone systems for use, for example, for manual mobile chairs.

Non-limiting, illustrative examples of motorized mobile chairs are used in the disclosure, including for front-wheel drive, rear-wheel drive, and mid-drive motorized mobile chairs. Various mobile chairs may have unique characteristics based on the wheel or track drive location, seating system features, user seating position, and other physical and/or operational characteristics of the motorized mobile chairs. In some embodiments, a placement or location of one or more sensors or other components of the upgrade system may be determined based, at least in part, upon those unique motorized mobile chair characteristics.

Motorized Mobile Chair

A mobile chair is essentially a chair with wheels used by a user when walking is difficult or impossible due to illness, injury, or disability. One example is a wheelchair. Mobile chairs come in a wide variety to meet the specific needs of their users, including:

Self-propelled manual mobile chairs.

Attendant-propelled manual mobile chairs.

Powered or motorized mobile chairs (power-chairs).

Mobility scooters.

Single-arm drive mobile chairs.
Reclining mobile chairs.
Standing mobile chairs.
Combinations of the above.

Mobile Chairs include specialized seating adaptions and/or individualized controls and may be specific to particular activities. The most widely recognized distinction in mobile chairs is powered (i.e. motorized) and unpowered (i.e. non-motorized). Unpowered mobile chairs are propelled manually by the user or attendant while powered mobile chairs are propelled using motors (typically electric motors, but including fossil fuel powered motors).

Motorized mobile chairs are useful for those unable to propel a manual mobile chair or who may need to use a mobile chair for distances or over terrain which would be fatiguing or impossible for the user to navigate in a manual mobile chair. They may also be used not just by people with "traditional" mobility impairments, but also by people with cardiovascular and fatigue-based conditions. A motorized mobile system (MMS) is a non-automobile motorized device which provides powered mobility to one or more users, including such systems as motorized mobile chairs, mobility scooters, electronic conveyance vehicles, riding lawn mowers, grocery carts, all-terrain vehicles (ATVs), golf carts, and other recreational and/or medical mobility systems, but excludes automobiles (passenger cars, trucks, passenger buses, and other passenger or property transporting motorized vehicles intended for licensed operation on state and national highways). For the sake of clarity, motorized mobile chair MMSs are described herein as exemplary embodiments; however, it should be clear that the same or similar systems and methods may be applied to other MMS embodiments.

A motorized mobile chair is generally four-wheeled or six-wheeled and non-folding. Four general styles of motorized mobile chair drive systems exist: front wheel drive, center wheel drive, rear wheel drive, and all-wheel drive. Powered wheels are typically somewhat larger than the trailing/castering wheels, while castering wheels on a motorized chair are typically larger than the casters on a manual chair. Center wheel drive (also referred to as mid-wheel drive) motorized mobile chairs typically have casters at both front and rear for a six-wheel layout and are often favored for their tight turning radii.

FIG. 1 depicts an embodiment of a front wheel drive motorized mobile chair 110 comprised of a base or chassis 120 and a seating system/seating assembly 130 attached to the base/chassis. Front wheel drive motorized mobile chairs are often used because of their superior curb-climbing capabilities. Motorized mobile chair chassis may also mount a specific curb-climber, a powered device to lift the front wheels of the motorized mobile chair over a curb. In addition to the more common four to six-wheeled configurations, motorized mobile chairs are available in self-balancing two-wheeled configurations which allow for enhanced terrain navigation.

Motorized mobile chairs are most commonly controlled by arm-rest mounted joysticks, which may have associated controls to allow the user to tailor control sensitivity for drive and/or turning or access multiple control modes, including modes for controlling the seating system, lights, indicators, or ancillary attachments. For users who are unable to use a hand controller, various alternatives are available, such as sip-and-puff controllers, which work by blowing into a sensor. In some cases, a controller may be mounted for use by an aide walking behind the chair rather than by the user. Capabilities include drive, general turning, and driving one drive-wheel forward while the other goes backward, thus turning the mobile chair within its own length.

The seating system on a motorized mobile chair can vary in design, including a basic sling seat and backrest, optional padding, comfortable cushions, backrest options, and headrests. Many companies produce aftermarket seat, back, arm, leg, and head rest options which can be fitted onto motorized mobile chairs. Some seat, back, arm, leg, and head rests are produced to aid with increased need for stability in the user's trunk or for those at increased risk of pressure sores from sitting. Leg rests may be integrated into the seating design and may include manual and/or powered leg rest adjustment for those users who want or need to vary their leg position. Motorized mobile chairs may also have elevation structures, tilt-in-space structures, and/or reclining structures, which are particularly useful for users who are unable to maintain an upright seating position for an extended period. These features can also help with comfort by shifting pressure to different areas over time or with positioning in a mobile chair when a user needs to get out of the chair or be hoisted.

Figure 2:
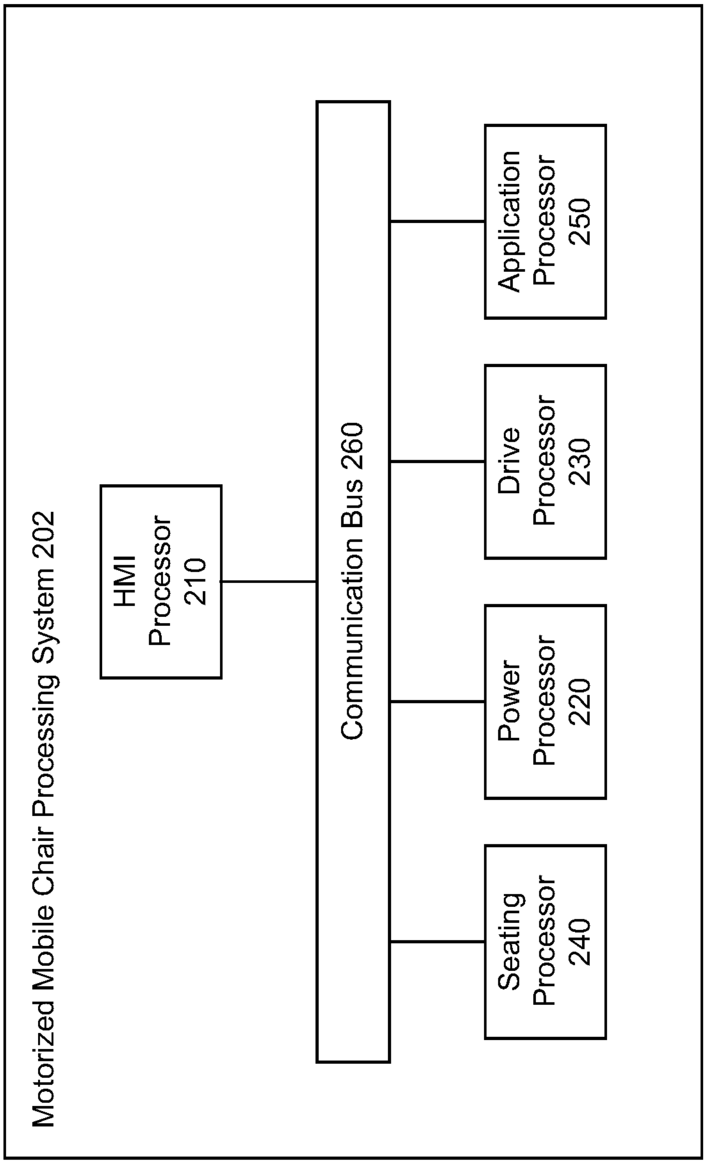
FIG. 2 depicts an example of a motorized mobile chair hardware system.

FIG. 2 depicts an example of a motorized mobile chair 202 hardware system where one or more processors 210-250 are connected via a communication bus 260. The one or more processors include one or more human machine interface (HMI) processors 210, one or more power processors 220, one or more drive processors 230, and one or more seating processors 240, each of which is hardware. Additionally, one or more application processors 250 optionally may be included, which are hardware. Each processor 210-250 executes software and may generate (i.e. create) and transmit and/or receive and process one or more control signals wherein the control signal is a wired or wireless signal, and wherein the control signal comprises one or more of a digital or an analog signal, and generally comprises or indicates data, instructions, and/or a state. The term "communication" may be used interchangeably with the term "control signal."

An HMI processor 210 may accept one or more user inputs from one or more HMI devices, such as a joystick, a touch screen, a voice command interface, an audio indicator, a tactile surface array, a brain machine interface, and/or a sip and puff type array. The HMI processor 210 processes the user inputs and, in response, generates and transmits one or more control signals with data and/or instructions to one or more processors (e.g. the drive processor 230) or other components of the motorized mobile chair. Control instructions may comprise one or more of a calculation, a logical comparison, a state, a change in state, an instruction, a request, data, a sensor reading, a sensor record, an adjustment of an operating parameter, a limitation of a feature, a limitation of a capability, an enablement of a feature, and/or an enablement of a capability. In an embodiment, one or more additional HMI processors 210 duplicate the HMI and its associated processor(s) for a caregiver HMI to enable a caregiver to physically drive, maneuver, or otherwise control the motorized mobile chair or its components.

A power processor 220 receives one or more control signals, for example from a charging system (not depicted) and/or battery voltage and/or current sensing sensors or other sensors of the motorized mobile chair, that cause the power processor to process the control signals and respond with one or more preconfigured responses to at least one of the HMI processor 210, the charging system, and/or the drive processor 230, wherein the preconfigured responses comprise at least one of blocking operation of one or more drive motors or other operations of the motorized mobile chair, setting one or more charge status indicators on an HMI of the motorized mobile chair (e.g. the main user HMI or a caregiver HMI), transmitting one or more control signals to a remote HMI (e.g. a phone paired with the motorized mobile chair or otherwise associated with the user or a caregiver or technician), and/or starting and/or stopping one or more charging operations of the charging system of the motorized mobile chair. A power processor 220 may additionally or alternatively receive, process, and/or transmit data generated from one or more sensors associated with one or more characteristics of the motorized mobile chair, such as battery voltage from a voltage divider or sensor or otherwise from the battery of the motorized mobile chair as examples, to one or more processors or other components of the motorized mobile chair.

A drive processor 230 receives one or more control signals, for example from the HMI processor 210, that cause the drive processor to process the control signals and respond with one or more preconfigured responses to the steering system and/or drive motor(s) of the motorized mobile chair, wherein the preconfigured responses include one or more of taking operational control of the steering system, taking operational control of the drive motor(s), steering the motorized mobile chair, and/or starting and/or stopping one or more drive motors to move the motorized mobile chair in one or more desired directions. A drive processor 230 may additionally or alternatively receive, process, and/or transmit data generated from one or more sensors associated with one or more characteristics of the motorized mobile chair, such as wheel position of the motorized mobile chair as measured by a rotary encoder as an example, to one or more processors or other components of the motorized mobile chair.

A seating processor 240 may include one or more processors used to control a powered seating assembly of the motorized mobile chair. The seating processor 240 receives one or more control signals (e.g. from the HMI or HMI processor) that causes it to process the control signals and respond with one or more preconfigured responses, wherein the preconfigured responses may comprise at least one of moving, measuring, changing a state, transmitting data, and/or taking operational control of the associated hardware (e.g. raising, lowering, or angling a seat of the motorized mobile chair). A seating processor 240 may additionally or alternatively receive, process, and/or transmit data about the seating assembly or use data generated by one or more sensors associated with one or more characteristics of the seating assembly, such as seat angle, leg position, and/or seat assembly elevation, to one or more processors or other components of the motorized mobile chair.

An application processor 250 may include one or more processors embedded in or in communication with ancillary products, such as a lighting controller, a phone associated with the user or a caregiver, or another $3^{rd}$ party device. Thus, the application processor 250 may be housed in the motorized mobile chair or a third party device, depending on the application. The application processor 250 receives one or more control signals that causes the processor 250 to process the control signals and respond with one or more preconfigured responses, wherein the preconfigured responses may comprise at least one of moving, measuring, changing a state, transmitting data, and/or taking operational control of associated hardware (e.g. increasing or decreasing a light brightness or turning a light on or off), displaying data and/or instructions, and/or seeking and/or receiving one or more inputs. An application processor 250 may additionally or alternatively supply data about the motorized mobile chair or use data generated by one or more sensors of the motorized mobile chair.

One or more control signals may be transmitted or received by one or more of the processors 210-240 and the application processor 250 when it is housed in the motorized mobile chair via a communication bus 260 wherein the communication bus enables one or more processors and/or other devices to communicate with each other. The term communication bus typically encompasses related hardware components (i.e. the physical interface) and software, including communication protocols by which communications are transmitted and received. In an embodiment, the communication bus 260 may comprise one or more of a controller area network (CAN) bus, an $I^2C$ bus, a serial bus, and/or a parallel bus. Alternatively or additionally, the communication bus 260 may utilize a TCP/IP protocol and/or a wireless physical network in an embodiment.

In one embodiment, the processors 210-240 and optionally processor 250 are programmed to transmit and receive control signals and other communications according to one or more protocols consistent with a type of communication bus 260 to which the processors are connected and over which they communicate. For example, when the communication bus 260 is a CAN bus, the processors 210-240 and optionally processor 250 are programmed to transmit and receive communications formatted for a CAN protocol, such as one or more CAN protocols published in one or more CAN specifications (e.g. specifications for CAN 2.0A, CAN 2.0B, CAN standard ISO 11898, CAN standard ISO 11898-1, CAN standard ISO 11898-2, CAN standard ISO 11898-3, CAN FD 1.0, or CAN with Flexible Data-Rate, the entire contents of which are incorporated herein by reference).

In one example, CAN formatted communications include a message identifier and data/payload. Additionally, start-of-frame identifiers, end-of-frame identifiers, reserved bits, and other logistical formatting and information may be included in the CAN communications, dependent on the specific CAN specification used. In an example, the message identifier may indicate the control signal is transmitted from a particular device, such as a joystick, another HMI, or another device, indicate the control signal is a command for a device to take an action, indicate the control signal is a type of control signal or type of action, or indicate the control signal includes a certain type of data. The priority of a particular communication also optionally may be indicated by the message identifier (e.g. where a communication with a first priority communication is to be processed or transmitted before a second communication with a second priority). Additionally or alternatively, the message priority may be determined based on the identification of the sending device. Other communication protocols may be used, and some other protocols include similar messaging fields.

In this embodiment, a processor 210-240 and optionally processor 250 only acts on (e.g. takes an action based on) the data/payload within a communication if the message identifier of the communication is a message identifier for which the processor is programmed to act. In this embodiment, one or more processors 210-240 and optionally processor 250 transmit communications over the CAN communication bus 260, and the communications are formatted at least with the message identifier and the data/payload. One or more other processors 210-240 and optionally processor 250 receive the communications, process each communication to determine if the message identifier of the communication is the type of message identifier on which it acts, ignores the communication data if the message identifier of the communication is not the type of message identifier on which it acts, and processes the data/payload and takes one or more actions based on that data/payload if the message identifier of the communication is the type of message identifier on which it acts. Other communication protocols may be used, and communications transmitted, received, processed, and routed according to those other protocols are transmitted, received, processed, and routed similarly.

In one example operation using the CAN communication bus 260 and CAN formatted communications, the user interface for a motorized mobile chair 110 is a joystick or other direction and/or speed providing device. A user moves the joystick or other direction and/or speed providing device to move the motorized mobile chair 110 in a direction and/or at a speed. The HMI processor 210 receives the user input from the joystick or other direction and/or speed providing device, converts that user input to direction and/or speed data, and creates and transmits a CAN formatted control signal with an HMI input message identifier and the direction and/or speed data. In one example, the direction and/or speed data are XX and YY inputs, where XX is an x position of the joystick and YY is a y position of the joystick, which are representative of direction and/or speed selected by the joystick or other direction and/or speed providing device. In another example, the direction and/or speed data are XX and YY inputs, where XX is an x axis position of the joystick or other direction and/or speed providing device and YY is a y axis position of the joystick or other direction and/or speed providing device, which are representative of direction and/or speed selected by the joystick or other direction and/or speed providing device, and in which XX is a number between −100 to 100 for the x axis position of the joystick and YY is a number between −100 to 100 for the y axis position of the joystick. In another example, the direction and/or speed data are XX and YY inputs, where XX and YY is a vector for direction and/or speed selected by the joystick or other direction and/or speed providing device.

The drive processor 220 receives the control signal transmitted from the HMI processor 210, processes the control signal to determine its message identifier, determines the message identifier of the control signal is the type of message for which it is programmed to act, reads the input data from the control signal (e.g. the X and Y input data in the above examples), acts on the control signal data, and causes the motor to drive or otherwise move the motorized mobile chair in a specific direction at a specific speed (e.g. according to the X and Y input data). In this example, the processors 210-250 are programmed to create, transmit, receive, and process CAN formatted communications. In another example, after the drive processor 220 reads the input data (e.g. the X and Y input data) from the control signal, the drive processor calculates or otherwise determines the proper power/voltage level to transmit to one or more motors of the motorized mobile chair 110 (depending on the model of the motorized motor chair) to move the motorized mobile chair in the direction and/or speed corresponding to the input data (e.g. the X and Y input data) and outputs the power/voltage level to the one or more motors.

Functions of one or more processors 210-250 may be combined in or to a single processor, and the processors may comprise one or more of a processor, multiple processors, an application-specific integrated circuit, and/or a field-programmable gate array.

Upgrade System

Figure 3:
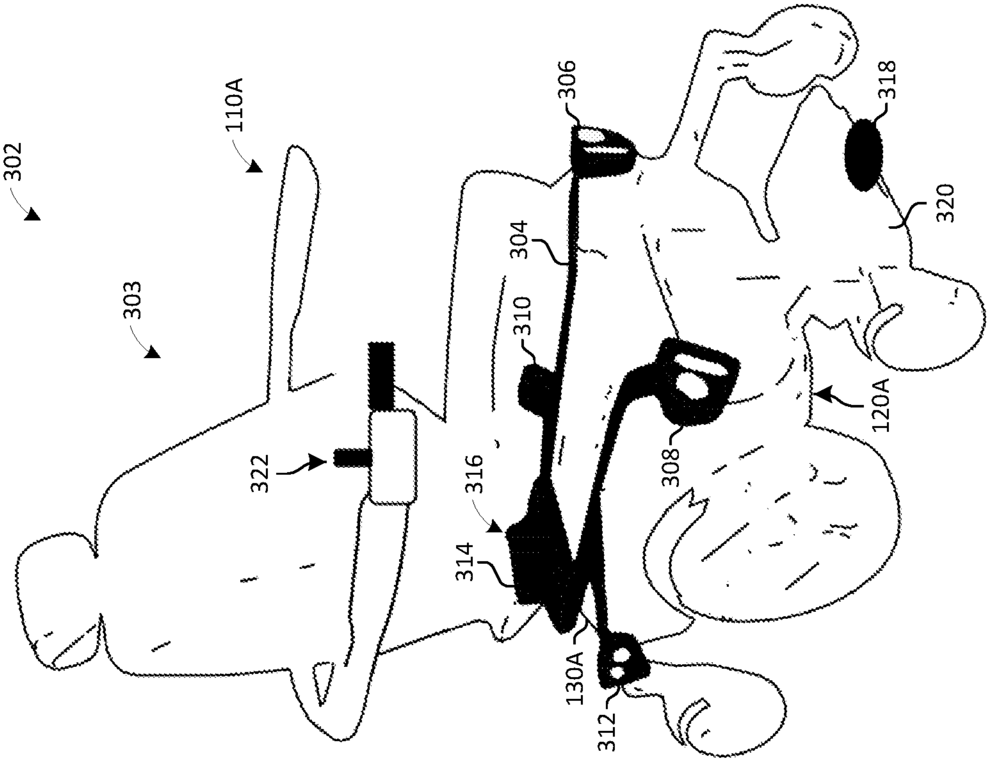
FIG. 3 depicts an embodiment of an upgrade system to upgrade a motorized mobile chair to a smart motorized mobile chair.

FIG. 3 depicts an embodiment of an upgrade system 302 to upgrade a motorized mobile chair 110A to a smart motorized mobile chair 303. The smart motorized mobile chair 303 includes a base 120A and a seating system 130A. The upgrade system 302 includes a frame 304 attachable to the structure of the motorized mobile chair 303 at one or more attachment points, one or more sensors or sensor modules 306-314 attached to or integrated with the frame, and an upgrade processing system 316 attached directly or indirectly to or integrated with the frame. In one embodiment, a rear-facing sensor module 314 is positioned in an enclosure with the upgrade processing system 316, and the enclosure is integrated with the frame 304. In another embodiment, the rear-facing sensor module 314 is not present in the upgrade system 302. In another embodiment, the upgrade system 302 optionally includes an independent sensor module 318 fixed to the foot rest 320 of the motorized mobile chair 303. In another embodiment, the upgrade system 302 optionally includes a user interface 322 to receive one or more instructions from a user and/or to provide one or more instructions, alerts, or feedback to the user (e.g. via light, sound, and/or haptic devices and/or visual displays).

In one embodiment, the frame 304 is a unitary structure (i.e. one single frame structure not assembled from separate frame components). Though, in other embodiments, the frame 304 may be made of multiple frame components assembled together to form the frame.

In yet other embodiments, the upgrade system 302 includes one or more additional sensors or sensor modules to sense or measure one or more characteristics of the user, such as one or more pressure sensors in the seat to measure pressure at various points in the seat (for example to measure/monitor/track user time in the seat and/or pressure points of the user's body), one or more moisture sensors (to measure potential wetness of the user in the seat), one or more heat sensors to measure user body temperature, a presence sensor to detect user presence in the motorized mobile chair, a heart rate sensor to measure user heart rate, a respiratory rate sensor to measure user respiratory rate, a weight sensor to measure user weight or weight distribution in the seat, and/or one or more sensors or processing systems in the upgrade processing system 316 to measure or determine user tiredness or fatigue levels.

One or more additional sensors or devices may be used to measure one or more characteristics of the motorized mobile chair 303, such as a global positioning system (GPS) received to receive location determining signals and/or one or more accelerometers and/or gyroscopes and/or inertial measurement units (IMUs) to measure acceleration, motion, and/or orientation of the motorized mobile chair. The one or more additional sensors or devices used to measure one or more characteristics of the motorized mobile chair 303 may be housed with the upgrade processing system 316, below the motorized mobile chair 303 seating assembly, and/or in other appropriate locations on the motorized mobile chair.

The upgrade processing system 316 provides the user with a better operating experience than with conventional mobile chairs. The upgrade processing system 316 integrates and communicates with one or more processors 210-250 and optionally over one or more communication busses 360. The upgrade processing system 316 receives control signals, data, communications, and/or sensor reports from one or more sensor modules 306, 308, 310, 312, and 314 and/or from one or more processors or components of the motorized mobile chair 303 (e.g. the HMI processor 210, the seating processor 220, the drive processor 230, the seating processor 240, and/or the application processor 230) and/or external to the motorized mobile chair (e.g. from a server, a user or caregiver phone or other device, and/or GPS signal transmitters). The upgrade processing system 316 processes the received signals (for example, using one or more rules of a rules engine in one example), makes one or more decisions or determinations based on the received signals and optionally the one or more rules, generates (creates) one or more output control signals and/or communications as a result of the processing, and transmits the one or more output control signals and/or communications to one or more processors or components of the motorized mobile chair 303 (e.g. the HMI processor 210, the seating processor 220, the drive processor 230, the seating processor 240, and/or the application processor 230), one or more components internal to the upgrade processing system, and/or one or more devices external to the motorized mobile chair (e.g. to a server or a user or caregiver phone or other device).

The upgrade processing system 316 connects with external servers to enable the upgrade processing system to collect, receive, and transmit health-related data and user configuration settings to the server. In one aspect, the upgrade processing system 316 pairs with a user phone or other user or caregiver device and transmits data and/or other communications to and receives data and/or other communications from the user phone or other user or caregiver device. The user phone or other user or caregiver device is configured to transmit data and/or other communications to and receive data and/or other communications from the server (e.g. via an application stored and operating on the user phone or other user or caregiver device configured to communicate with the upgrade processing system 316 and the server). Alternately, the upgrade processing system 316 may communicate directly with the server to transmit data and/or other communications to and receive data and/or other communications from the server (e.g. via one or more cellular, Wi-Fi, Bluetooth, or other communication transceivers of the upgrade processing system).

In one example of operation, the upgrade processing system 316 receives one or more sensor reports or other data from one or more sensor modules 306-314 and 318, receives a control signal from the HMI processor 210 or other user interface of the motorized mobile chair 303, processes the control signal and the one or more sensor reports or other sensor module data (e.g. to determine an action to be taken by or instruction to be made to a component of the motorized mobile chair), and transmits a control signal (e.g. a drive control signal to drive processor 230 or another control signal to another processor or component of the motorized mobile chair to cause the component to take one more actions, such as a navigation operation). Other examples are discussed below.

Each sensor module 306-314 and 318 may include one, two, or more object detection sensors enclosed in a protective housing that attaches to the frame 304 in order to ensure the proper orientation of the object detection sensors relative to the motorized mobile chair 303. Alternatively, a sensing module 306-314 and 318 may include one or more object detection sensors, one or more sensor processors, and one or more lighting or signaling devices. In an exemplary embodiment, a front-right sensing module 306 and/or left-front sensing module 308 includes a stereo camera pair for object detection, a RADAR, a sensor processor to process one or more of data from the stereo camera pair or RADAR, and one or more lights which provides lighting and signaling capabilities.

Smart Motorized Mobile Chair Processing System

A smart motorized mobile system (S-MMS) or smart motorized mobile chair of the present disclosure is an evolution of motorized mobile chair technology and includes a new controller and control architecture, some of which includes secure methods for collecting and transmitting data across one or more networks. The smart motorized mobile chair is configured for the user's unique abilities, needs, and health, with the goal of a safe, secure, and social independence for the user. To accomplish this, new sensors for situational awareness and user health monitoring, communications technologies, and integrated software and hardware systems, are integrated to new and existing motorized mobile chairs to create smart motorized mobile chairs.

Figure 4:
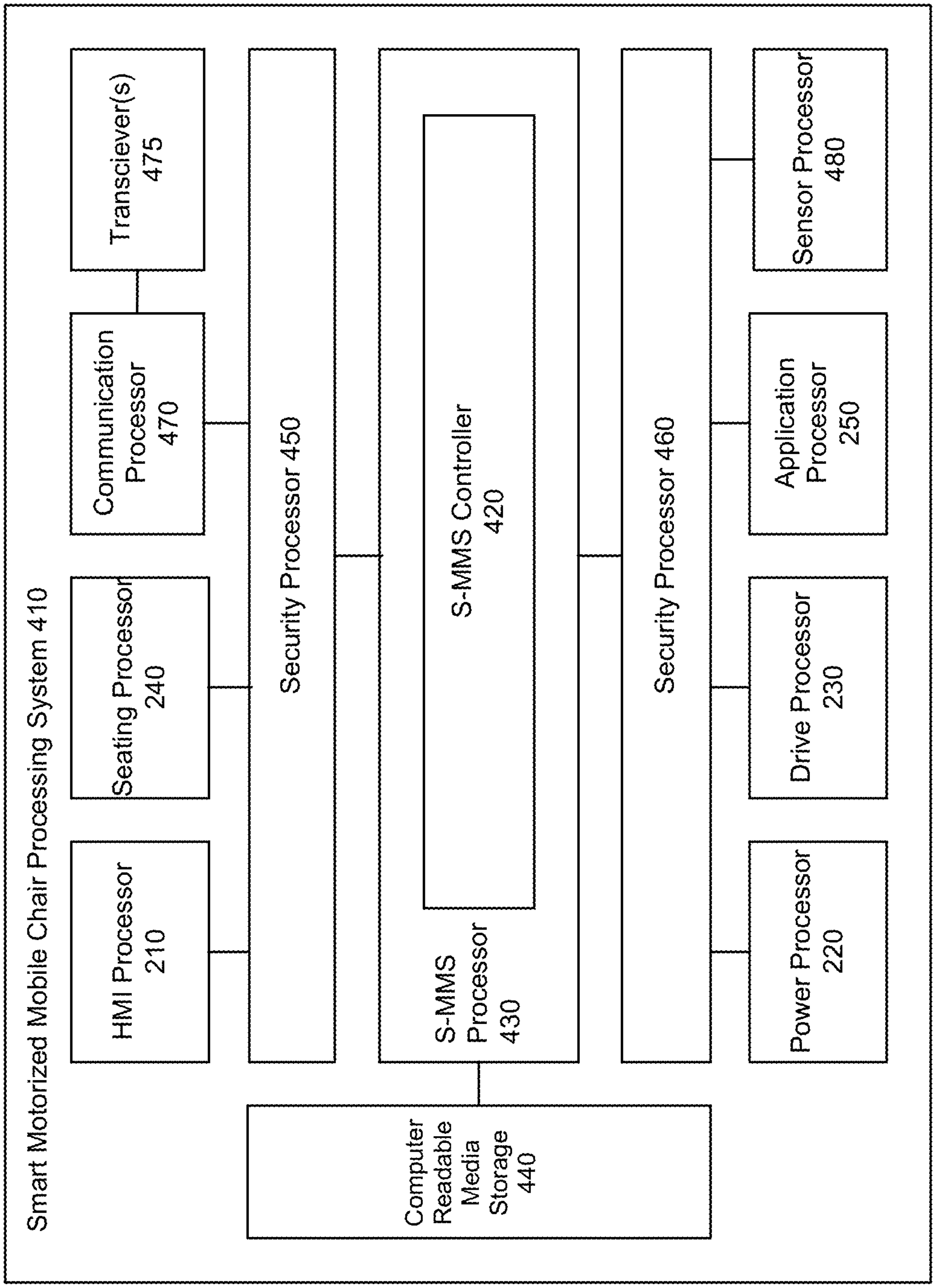
FIG. 4 depicts an embodiment of hardware and software components of a smart motorized mobile chair processing system.

FIG. 4 depicts an embodiment of hardware and software components of a smart motorized mobile chair processing system 410. The hardware and software components of the smart motorized mobile chair processing system 410 include an S-MMS controller 420, an S-MMS processor 430, computer readable storage media 440, a security processor 450, an optional second security processor 460, a communication processor 470, and a sensor processor 480, the HMI processor 210, the drive processor 230, the seating processor 240, and an optional application processor 250 integrated into a single unit as shown in FIG. 4. The S-MMS controller 420, S-MMS processor 430, computer readable storage media 440, security processor 450, optional second security processor 460, communication processor 470, and sensor processor 480 are an upgrade processing system for the motorized mobile chair in one embodiment.

An S-MMS controller 420 is the software operating system of the smart motorized mobile chair processing system 410 and includes executable program instructions executed on an S-MMS processor 430. The S-MMS controller 420 is stored on computer readable media storage 440, which is hardware storage. Executable program instructions for the S-MMS controller 420 also may be remotely stored on a smart device or server, or in some combination of the computer readable media storage 440, the smart device, and the server. The S-MMS controller 420 also uses the computer readable storage media 440 for data storage and retrieval during operation.

The S-MMS controller 420 processes data generated from one or more sensors used by the smart motorized mobile chair 303 or otherwise associated with one or more characteristics of the smart motorized mobile chair or a user of the smart motorized mobile chair. The sensor data may be received in one or more sensor reports or other communications received from one or more sensors and/or from the sensor processor 480.

The S-MMS controller 420 also receives one or more user inputs, such as from the HMI processor 210. The S-MMS controller 420 processes those user inputs and makes a determination about whether or not to effect the user inputs, such as by generating one or more control signals to cause the motorized mobile chair 303 to perform one or more navigation operations or to move the seating assembly.

The S-MMS controller 420 controls navigation operations for the smart motorized mobile chair 303, including for collision control and stability management. The S-MMS controller 420 may generate one or more control signals based, at least in part, on one or more user inputs and/or sensor data from one or more sensors. For example, the S-MMS controller 420 may generate one or more control signals to cause the motorized mobile chair 303 to perform one or more navigation operations based on processed sensor data and/or based on the one or more user inputs.

The S-MMS processor 430 interacts with the computer readable media storage 440 to execute the S-MMS controller 420. The S-MMS processor 430 also receives communications from and transmits communications to the security processors 450 and 460, each of which is hardware. The S-MMS processor 430 may be paired with a lock-step processor (not depicted) for critical life, health, and safety applications, in some embodiments. The S-MMS processor 430 in an embodiment may include a multicore central processing unit (CPU) and one or more graphics processing unit (GPU) cores. Both the CPU and GPU process one or more communications and/or their data. Alternately, the CPU processes one or more portions of a communication and/or its data, and the GPU processes one or more portions of a communication and/or its data. Alternately, the CPU and GPU work together to process one or more communications and/or their data. In the above examples, the CPU and GPU separately or working together generate one or more control signals. In one example, the CPU passes one or more communication and/or data processing operations to the GPU and/or requests the one or more communication and/or data processing operations to be performed by the GPU, the GPU transmits results of that processing back to the CPU, and the CPU finalizes processing for the one or more communication and/or data processing operations and generates one or more control signals in response thereto.

The computer readable media storage 440 may include volatile and non-volatile non-transitory computer storage media, e.g. memory, for storing information. One or more secure, encrypted memory partitions of the computer readable media storage 440 are used to store electronic protected health information (ePHI) and other secure health data in some embodiments. The data stored on the secure memory of the computer readable media storage 440 is only made available to one or more pre-authorized systems, wherein the pre-authorized system comprises a device or service associated with an individual user. This may include the smart mobile motorized chair 303, a smart device, a computer, a data terminal, and/or a device or service associated with an approved third party.

The security processors 450 and 460 receive and process communications from other components of the smart motorized mobile chair processing system 410, such as the HMI processor 210, the power processor 220, the drive processor 230, the seating processor 240, and the optional application processor 250 and determine whether or not to transmit or passed those communications to the S-MMS controller 420 operating on the S-MMS processor 430. When the security processors 450 and 460 determine one or more communications should be passed or transmitted to the S-MMS controller 420, they do pass or transmit those communication to the S-MMS controller. The security processors 450 and 460 also transmits or passws communications from the S-MMS controller 420 operating on the S-MMS processor 430 to the HMI processor 210, the power processor 220, the drive processor 230, the seating processor 240, and/or the optional application processor 250.

In one embodiment, the security processors 450 and 460 are programmed to transmit only particular received communications to the S-MMS controller 420. In this embodiment, the security processors 450 and 460 filter communications they receive and only transmit communications to the S-MMS controller 420 that meet one or more parameters. The parameters may include, for example, selected types of communications, communications having selected identifications in a portion of the communication, communications having a selected type of data (e.g. sensor data or HMI inputs), communications that pass or include one or more security parameters, and/or other parameters. In one example, security processors 450 and or 460 communicate with the HMI processor 210, the drive processor 230, the seating processor 240, and/or the application processor 250 via a control area network (CAN) bus interface, such as over the communication bus 260. In this example, the communication bus 260 is a CAN bus.

In one embodiment, the security processors 450 and 460 may host (i.e. execute) modules and other software, such as secure abstraction layers. Abstraction layers are used as a way of hiding the implementation details of a particular set of functionalities, allowing the separation of concerns to facilitate interoperability and platform independence. One such abstraction layer is an application programming interface (API). An API allows for communication between the various components, such as between an application and an operating system or between one processor and/or application and another processor and/or application. A secure abstraction API is a set of subroutine definitions, protocols, and tools for building applications. Additionally or alternatively, the security processors may host services, such as watch-dog and data source authentication services. The security processors 450 and 460 may be integrated into a single processor or distributed. The security processors 450 and 460 are optional in some embodiments.

A communication processor 470 is used to establish one or more connections with one or more devices internal to and/or external to the smart motorized mobile chair and transmits communications to, and receives communications from, one or more devices internal to and/or external to the smart motorized mobile chair 303 via wired or wireless communications through wired or wireless communication devices, such as one or more transceivers 475. The communication processor 470 may be used for secure transmission and/or secure reception of data.

As an example, the communication processor 470 may use one or more wireless or wired interfaces to send and receive signals via cellular (e.g. LTE CAT M1, 5G, and/or MB IoT), 802.11, Wi-Fi, 802.15, Bluetooth, Bluetooth Low Energy (BLE), 802.20, WAVE 802.11p, a control area network (CAN), a serial interface, a parallel interface, and/or WiMAX. Thus, the one or more transceivers 475 or other wireless devices associated and the communication processor 470 may communicate using one or more of cellular (e.g. LTE CAT M1, 5G, and/or MB IoT), 802.11, Wi-Fi, 802.15, Bluetooth, Bluetooth Low Energy, 802.20, and/or WiMAX protocols and communications as an example. Additionally or alternatively, the communication processor 470 may receive signals wirelessly from one or more global positioning system (GPS) transmitters. In one example, the one or more transceivers 475 include a GPS receiver.

In some embodiments, the S-MMS processor 430 has an integrated communication processor 470 and transceiver 475 in place of the communication processor or the S-MMS processor performs the functions of the communication processor and the transceiver.

A sensor processor 480 receives data generated from one or more sensors used by the smart motorized mobile chair 303 or otherwise associated with one or more characteristics of the smart motorized mobile chair or a user of the smart motorized mobile chair, such as through one or more sensor reports or other communications received from one or more sensors. The sensor processor 480 may process the received data or communications, transmit the received data or communications or processed received data or communications or one or more control instructions resulting from processing the received data to the S-MMS control 320 operating on the S-MMS processor 430, store the received data or communications in a memory (e.g. the computer readable media storage 440), and/or transmit the received data or communications from the smart motorized mobile chair 303 via the communication processor 470. Multiple sensors may use a single sensor processor 480 or multiple processors. Additionally or alternatively, individual sensors may have their own (e.g. dedicated) sensor processor(s).

In one embodiment, the sensor processor 480 is not present in the smart motorized mobile chair processing system 410. In one example of this embodiment, one or more sensors have their own dedicated on-board sensor processor (e.g. in a common sensor module that houses the sensor and the sensor processor) and/or the type of sensor data generated by one or more sensors does not require pre-processing by a sensor processor. In both of those instances, the sensor data is transmitted directly from a sensor or sensor module or a sensor processor of a sensor module to the S-MMs controller 320 (e.g. in one or more sensor reports or other communications).

A single S-MMS processor 430 may perform the functions of one or more or all of the security processor 450, optional security processor 460, communication processor 470, and sensor processor 480. In that instance, the separate security processor 450, optional security processor 460, communication processor 470, and/or sensor processor 480 are not present. Moreover, a single S-MMS processer 430 may perform the functions of one or more or all of the communication processor 470 and the sensor processor 480 when the security processors 450 and 460 are not used. In that instance, the separate security processor 450 and optional security processor 460 are not present and the communication processor 470 and/or sensor processor 480 are not present.

The S-MMS processor 430, security processor 450, optional second security processor 460, communication processor 470, and sensor processor 480 of the motorized mobile chair processing system 410 may be integrated with the HMI processor 210, drive processor 230, seating processor 240, and optional application processor 250 into a single unit as shown in FIG. 4. Alternately, the S-MMS processor 430, security processor 450, optional second security processor 460, communication processor 470, and sensor processor 480 of the motorized mobile chair processing system 410 may communicate with the HMI processor 210, drive processor 230, seating processor 240, and/or optional application processor 250 through the communication bus 260, other communication processor, other communication interface, or other communication device. Alternately, one or more of the S-MMS processor 430, security processor 450, optional second security processor 460, and sensor processor 480 may communicate with the communication processor 470, and the communication processor communicates with one or more of the HMI processor 210, drive processor 230, seating processor 240, and/or optional application processor 250 through the communication bus 260, other communication processor, other communication interface, or other communication device. Such communication includes transmitting communications/control signals to and receiving communications/control signals from the various devices. In an example, the communication processor 470 and/or one or more security processors 450 and or 460 communicate with the HMI processor 210, the drive processor 230, the seating processor 240, and/or the application processor 250 via a CAN bus interface. In this example, the communication bus 260 is a CAN bus.

In an embodiment, the functions of one or more of the HMI processor 210, the drive processor 230, the seating processor 240, and/or the application processor 250 may be completed by one or more of the S-MMS processor 430, security processor 450, optional second security processor 460, communication processor 470, and/or sensor processor 480.

Each of the processors 210, 230, 240, 250, 430, 450, 460, 470, and 480 executes software and may produce control signals wherein the control signal is a wired or wireless signal, and wherein the control signal comprises one or more of a digital signal and/or an analog signal, wherein the one or more signals and generally comprises at least one of data, instructions, and/or a state. The processors 210, 230, 240, 250, 430, 450, 460, 470, and 480 may comprise one or more of a processor, multiple processors, an application-specific integrated circuit, and/or a field-programmable gate array. The term "communication" may be used interchangeably with the term "control signal."

In one embodiment, one or more of the S-MMS processor 430, the security processors 450-460, and the communication processor 470 communicate over a communication bus (e.g. communication bus 260) to which the processors are connected. In this embodiment, the security processors 450-460 and optionally the S-MMS controller 420 on the S-MMS processor 430 (or optionally other software on the S-MMS processor) and the communication processor 470 are programmed to transmit and receive control signals and other communications according to one or more protocols consistent with a type of communication bus (e.g. communication bus 260) or other wired or wireless communication devices to which the processors are connected and over which they communicate.

For example, when the communication bus to which the security processors 450-460 and optionally the S-MMS controller 420 and optionally the communication processor 470 are connected is a CAN bus, the security processors 450-460 and optionally the S-MMS controller 420 on the S-MMS processor 430 (or optionally other software on the S-MMS processor) and the communication processor 470 are programmed to transmit and receive communications formatted for a CAN protocol, such as one or more CAN protocols published in one or more CAN specifications (e.g. specifications for CAN 2.0A, CAN 2.0B, CAN standard ISO 11898, CAN standard ISO 11898-1, CAN standard ISO 11898-2, CAN standard ISO 11898-3, CAN FD 1.0, or CAN with Flexible Data-Rate, the entire contents of which are incorporated herein by reference). In one example, CAN formatted communications include a message identifier and data/payload. In an example, the message identifier may indicate the control signal is transmitted from a particular device, such as a joystick, another HMI, or another device, indicate the control signal is a command for a device to take an action, indicate the control signal is a type of control signal or type of action, or indicate the control signal includes a certain type of data. Additionally, start-of-frame identifiers, end-of-frame identifiers, reserved bits, and other logistical formatting and information may be included in the communications, dependent on the specific CAN specification used. In this embodiment, a processor only acts on (e.g. takes an action based on) the data/payload within a communication if the message identifier of the communication is the message identifier for which the processor is programmed to act.

In this embodiment, one or more of the S-MMS controller 420 operating on the S-MMS processor 430, the security processors 450-460, the communication processor 470, the HMI processor 210, the power processor 220, the drive processor 230, the seating processor 240, and the application processor 250 transmit CAN formatted communications over the CAN communication bus, and the communications are formatted at least with a message identifier and the data/payload. One or more other of the S-MMS processor 430, the security processors 450-460, the communication processor 470, the HMI processor 210, the power processor 220, the drive processor 230, the seating processor 240, and the application processor 250 receive the communications, process each communication to determine if the message identifier of the communication is the type of message identifier on which it acts, ignores the communication data if the message identifier of the communication is not the type of message identifier on which it acts, and processes the data/payload of the communication and takes one or more actions based on that data/payload if the message identifier of the communication is the type of message identifier on which it acts.

Figure 5A:
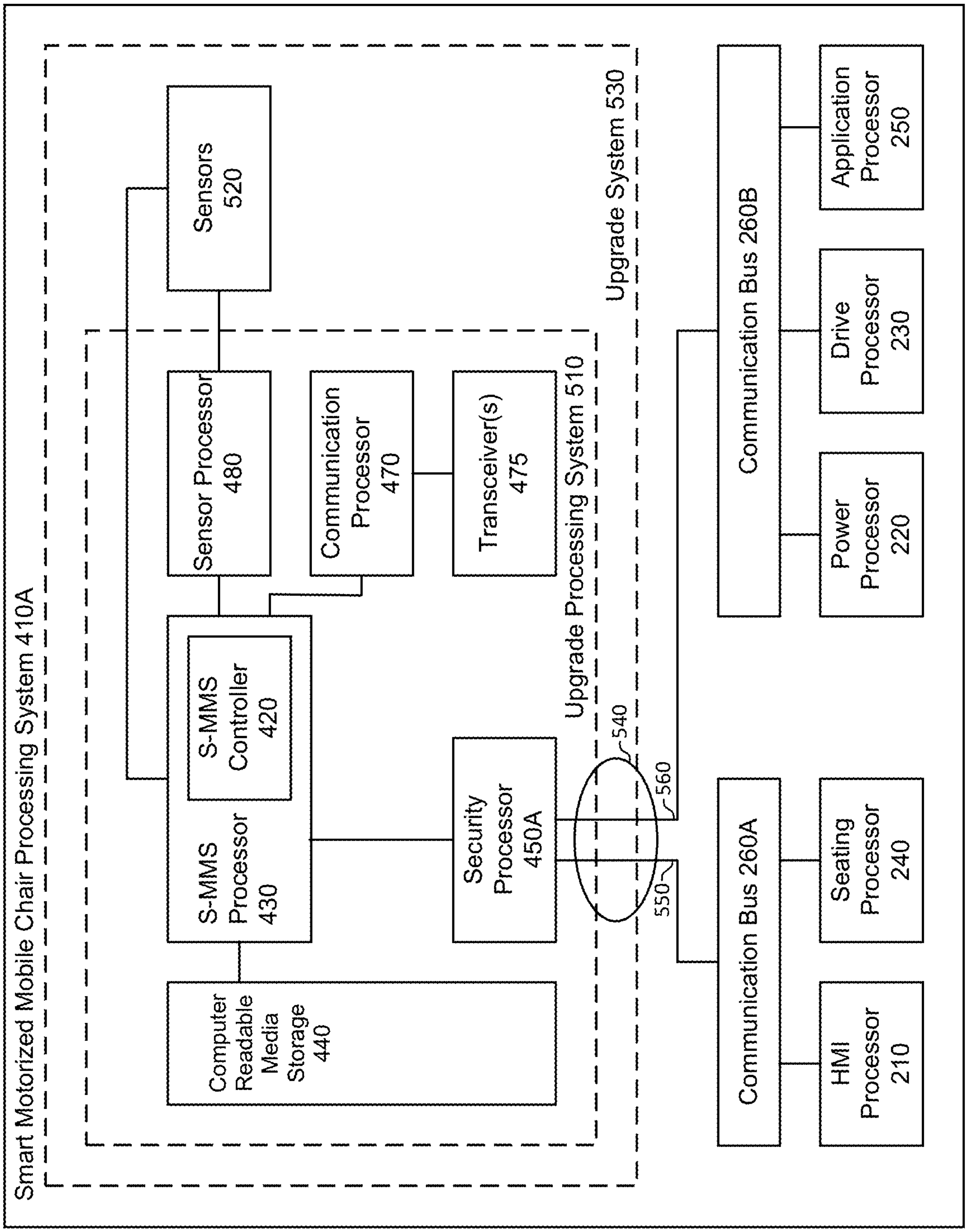
FIGS. 5A-5C depict embodiments of hardware and software components of a smart motorized mobile chair processing system.
Figure 5B:
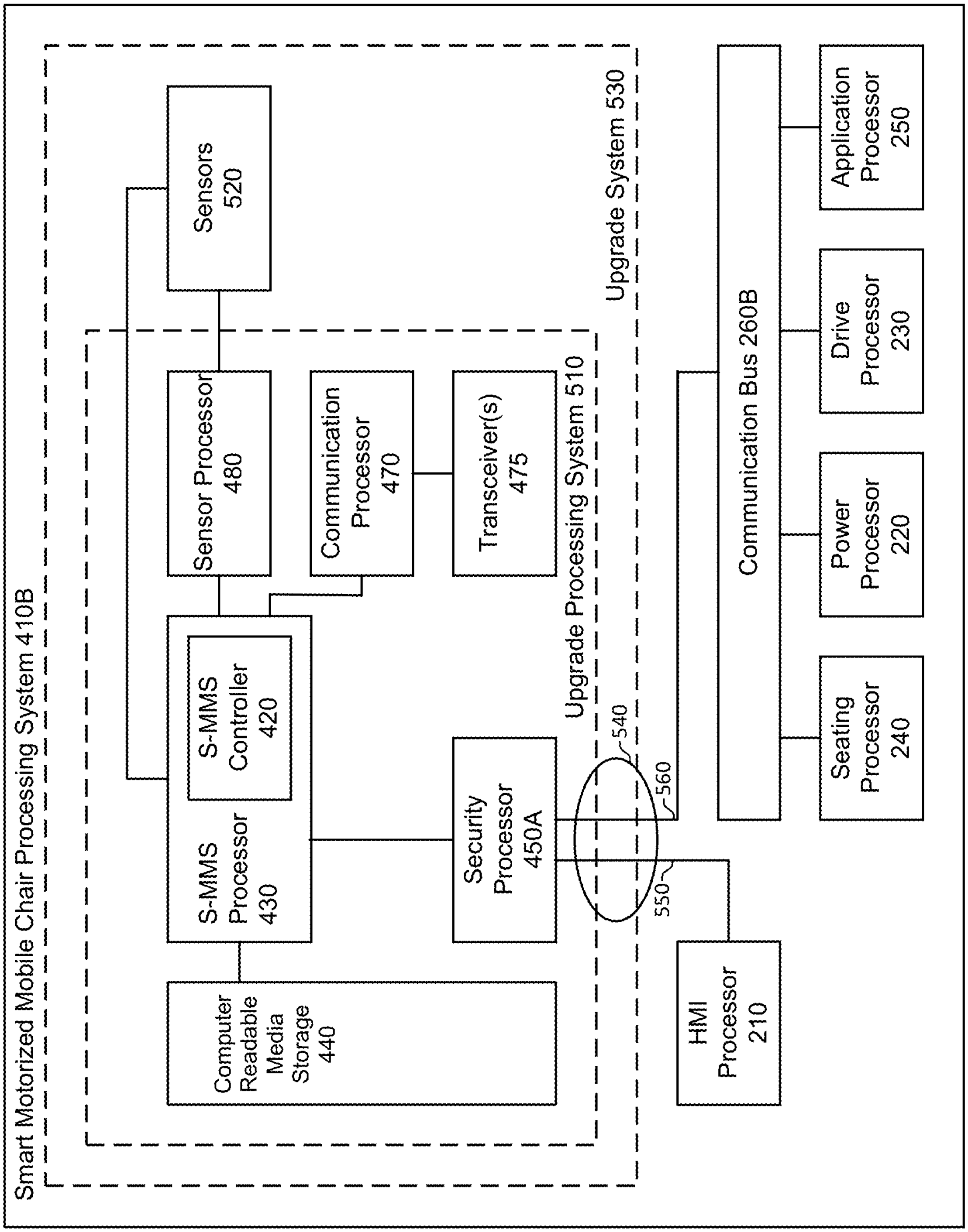

FIG. 5A depicts an embodiment of hardware and software components of a smart motorized mobile chair processing system. The smart motorized mobile chair processing system 410A is created by adding an upgrade processing system 510 to a new or existing motorized mobile chair processing system (e.g. mobile chair processing system 202). One or more sensors 520 are further added to the upgrade processing system 510 to create hardware and software components for an upgrade system 530.

The upgrade processing system 510 includes an S-MMS processor 430, which is hardware that executes the S-MMS controller 420, which is software. The S-MMS 420 controller performs the functions described above. The upgrade processing system 510 of FIG. 5A additionally includes computer readable media storage 440, a security processor 450A, a communication processor 470, and a sensor processor 480. As noted above, the S-MMS processor 430 may perform the functions of one or more of the security processor 450A, the communication processor 470, and/or the sensor processor 480. In that instance, the one or more of the security processor 450A, the communication processor 470, and/or the sensor processor 480 is/are not present as separate components in the upgrade processing system 510.

In the embodiment of FIG. 5A, the communication 260 bus of FIG. 2 has been divided into two separate communication buses 260A and 260B. The upgrade processing system 510 connects between the two separate communication buses 260A and 260B, such as at a connection 540, such that the security processor 450A (or alternately the S-MMS controller 430) connects to the two separate (first and second) communication buses 260A and 260B, with one connection 550 between the security processor (or alternately the S-MMS controller 430) and the first communication bus 260A and on another connection 560 between the security processor (or alternately the S-MMS controller 430) and the second communication bus 260B. One or more components of the motorized mobile chair processing system 202 connect to the first communication bus 260A, and one or more other components of the motorized mobile chair processing system connect to the second communication bus 260B. In the embodiment of FIG. 5A, the HMI processor 210 and the seating processor 240 connect to the first communication bus 260A, and the power processor 220, the drive processor 230, and the optional application processor 250 connect to the second communication bus 260B.

The communication 260 bus of FIG. 2, in one example, includes one or more wires. Dividing the communication 260 bus in the embodiment of FIG. 5A into the two separate first and second communication buses 260A and 260B involves separating and adding wires and is fast and simple, does not require special tooling, and does not require removal or replacement of the original processing components of the mobile chair processing system 202. For example, separating and removing one or more wires may include removing one or more original wires for an original bus and adding one or more new wires for one or more new busses or one or more wires for each new bus, where a bus in this example is one or more wires and connecting a component to a bus in this example is connecting the component to the one or more wires of the bus.

In one example, a CAN bus includes two wires (and terminators), and each component connects one wire from the component to each of the two bus wires, such as by connecting a separate wire from the component to each bus wire for a total of two wires connecting from the component to the bus. In this example, a component is removed from a bus by removing from the bus wires the two wires leading from that component to the bus, and a component is added to a bus by connecting two wires from that component to the bus.

In the example of the HMI processor 210 and seating processor 240 being moved to a separate communication bus 460A, the wires from the HMI processor and or seating processor leading to the communication bus 460B are removed. Those two wires from each of the HMI processor 210 and seating processor 240 are connected to two other new communication bus 460A wires. Two wires are then connected from the security processor 450A to the two wires of the new communication bus 460A, and two other wires are connected from the security processor to the two wires of the other communication bus 460B.

However, other busses may require a single wire from the component to the bus. Moreover, other bus types may be used.

Therefore, the upgrade processing system 510 is able to easily upgrade or retrofit a new or existing motorized mobile chairs at a significantly lower cost and ease than having to remove or replace the original processing components of the mobile chair processing system 202. Alternately, the upgrade processing system 510 is able to easily be inserted into manufacturing a processing system of an OEM mobile chair without requiring a significant redesign of the OEM processing system. Dividing the communication 260 bus into two separate first and second communication busses 260A and 260B allows the upgrade processing system 510 to modify and arbitrate communications between the user facing elements of the processing system 410 and the machine focused elements of the processing system. User facing elements of the processing system include things with which the user directly interacts, such as the HMI (HMI processor 210) and seating system (seating processor 240) for example. The machine focused elements of the processing system are necessary for the S-MMS to function but aren't typically directly interacted with by the user, such as the motor controller (drive processor 230), battery management system (power processor 220), and other feature specific systems (e.g. application processor 250) for example. Additionally, dividing the communication 260 bus into two separate first and second communication busses 260A and 260B allows the upgrade processing system 510 to operate with limited information or coordination with the OEM of a mobile chair such that a unique, OEM defined, message identifier is not required for the upgrade processing system 510 to send control messages on the OEM communications bus.

In an embodiment, the security processor 450A is an integrated circuit or microprocessor that includes a transceiver (e.g. a CAN transceiver). The transceiver hosts subroutine definitions, protocols, and/or tools for communicating with or via the communication bus 260A and/or 260B or a single communication bus, such as the combination of the communication buses 260A and 260B.

In an exemplary embodiment, a processor of the upgrade processing system 510 (e.g. the security processor 450A or the S-MMS processor 430 either directly or via the security processor 450A) accepts one or more control signals or messages from a first communication bus 260A or 260B. For example, the one or more control signals or messages may have been transmitted from the HMI processor 210, the power processor 220, the drive processor 230, the seating processor 240, or the optional application processor 250.

The received control signal or message is processed (e.g. analyzed) by software on the processor (e.g. security processor 450A or S-MMS processor 430) against predefined rules or instructions stored in memory 440. The processor (e.g. security processor 450A or S-MMS processor 430) then either modifies the received control signal or message based on the predefined rules or instructions stored in memory 440, does not modify the control signal or message based on the predefined rules or instructions stored in memory, or generates (creates) a new control signal or message based on the predefined rules or instructions stored in memory. The processor (e.g. security processor 450A or S-MMS processor 430) transmits the modified, unmodified, or newly generated control signal or message on a second communication bus 260B or 260A (in the case of the S-MMS processor 430, either directly or via the security processor 450A) to be transmitted to and for use (e.g. to be processed) by one or more processors connected to that communication bus, such as the HMI processor 210, the seating processor 220, the drive processor 230, the seating processor 240, and the optional application processor 250, in an example.

In this example, decision making regarding modifying or not modifying the one or more control signals communicated by or between the communication bus 260A and/or 260B (or a single communication bus such as the combination of the communication buses 260A and 260B) or generating one or more new control signals based on the one or more control signals communicated by or between the communication bus 260A and/or 260B (or a single communication bus such as the combination of the communication buses 260A and 260B) may be performed by the security processor 450A, by the S-MMS controller 420 operating on the S-MMS processor 430, and/or by a combination of the two.

In another example of these embodiments, a processor (e.g. security processor 450A or S-MMS processor 430) processes a received control signal or message and then either modifies the received control signal or message based on the predefined rules or instructions stored in memory 440, does not modify the control signal or message based on the predefined rules or instructions stored in memory, or generates (creates) a new control signal or message based on the predefined rules or instructions stored in memory. The processor (e.g. security processor 450A or S-MMS processor 430) transmits the modified, unmodified, or newly generated control signal or message on the same bus or a second communication bus, depending on the embodiment.

In another embodiment, a control signal or message is received by the security processor 450A from a first communication bus 260A or 260B, for example one or more HMI inputs to cause one or more navigation operations). The received control signal or message is processed (e.g. analyzed) by software on the security processor 450A against predefined rules or instructions stored in memory 440. The security processor 450A then determines, based on the rules or instructions, whether or not to transmit the received control signal or message to the S-MMS processor 430 (e.g. to be processed by the S-MMS controller 420). If the security processor 450A transmits the received control signal or message to the S-MMS processor 430, the S-MMS controller 320 processes the received control signal or message against predefined rules or instructions stored in memory 440 and determines whether to modify the received control signal or message based on the predefined rules or instructions stored in memory, to not modify the control signal or message based on the predefined rules or instructions stored in memory, or to generate (create) a new control message based on the predefined rules or instructions stored in memory. The S-MMS controller 420 transmits the modified, unmodified, or newly generated control signal or message to the security processor 450A, and the security processor transmits the modified, unmodified, or newly generated control signal or message on a second communication bus 260B or 260A. In one example, if the security processor 450A received the control signal or message on the communication bus 260A, the security processor transmits the modified, unmodified, or newly generated control signal or message on the other communication bus 260B. In another example, if the security processor 450A received the control signal or message on a communication bus 260B, the security processor transmits the modified, unmodified, or newly generated control signal or message on the other communication bus 260A.

In another embodiment, the S-MMS controller 230 uses one or more received control signals from the security processor 450A (e.g. from one or more control signals having one or more user inputs received from the HMI processor 210), one or more sensor reports received from the sensor processor 480 and/or the sensors 520, one or more control signals received via the communication processor 470, and/or one or more pieces of data retrieved from computer readable media storage 440 to determine whether the received control signal should be modified or not modified or whether a new control signal should be created. The modified, unmodified, or newly created control signal is then transmitted as an output control signal from the S-MMS controller 420 to the security processor 450A which transmits the output control signal on the communication bus 260B or 260A (or a single communication bus, such as the combination of the communication buses 260A and 260B) to one of the other processors or components (e.g. the HMI processor 210, the seating processor 220, the drive processor 230, the seating processor 240, or the application processor 250).

In another embodiment, it is not necessary for the security processor 450A or S-MMS processor 430 to receive a control signal or message and either modify it or create a new control signal or message to replace the origin control signal or message. In this embodiment, the upgrade processing system 530 is not a retrofit of an existing motorized mobile chair processing system 202 and is able to generate original control signals or messages with one or more data and/or instructions to cause or effect one or more actions from one or more components of the motorized mobile chair.

In the embodiment of FIG. 5A, the security processor 450A communicates over the communication bus 260A and the communication bus 260A. The HMI processor 210 and the seating processor 240 communicate over the communication bus 260A, and the power processor 220, the drive processor 230, and the application processor 250 communicate over the communication bus 260B.

In this embodiment, the security processor 450A effectively intercepts control signals transmitted from the HMI processor 210 and the seating processor 240 over the communication bus 260A having message types or message identifiers normally processed by the power processor 220, the drive processor 230, and/or the application processor 250 and transmits those control signals to the S-MMS controller 420. The S-MMS controller 420 processes those control signals as described herein, including based on sensor data from one or more of the sensor modules, modifies or does not modify the control signals or generates (creates) new control signals based on that processing, and transmits the modified, unmodified, or new control signals to the security processor 450A. The security processor 450A transmits those received control signals on the communication bus 260B, and the power processor 220, the drive processor 230, and/or the application processor 250 receive those control signals and process those control signals as described above, e.g. if the control signal is the type of message or has the message identifier for which it is programmed to act. As used in this paragraph, intercepting a control signal by a first component includes receiving the control signal by the first component so the control signal is not received by a second component (e.g. the second component for which the control signal was intended or that would normally receive the control signal), such as by placing the first component before the second component in a communication path over which the control signal is transmitted or creating a new communication path between the first component and the second component and creating or using another communication path between the first component and components other than the second component, or causing another control signal to have a higher priority to be processed by the other component over the control signal.

The security processor 450A also effectively intercepts control signals transmitted from the power processor 220, the drive processor 230, and the application processor 250 over the communication bus 260B having message types or message identifiers normally processed by the HMI processor 210 and/or the seating processor 240 and transmits those control signals to the S-MMS controller 420. The S-MMS controller 420 processes those control signals as described herein, including optionally based on sensor data from one or more of the sensor modules, modifies or does not modify the control signals or generates (creates) new control signals based on that processing, and transmits the modified, unmodified, or new control signals to the security processor 450A. The security processor 450A transmits those received control signals on the communication bus 260A, and the HMI processor 210 and/or the seating processor 240 receive those control signals and process those control signals as described above, e.g. if the control signal is the type of message or has the message identifier for which it is programmed to act.

In an embodiment, the security processor 450A may effectively intercept control signals transmitted from a processor on the communication bus 260A and, based on the message identifier, transmit the control signal directly onto the communication bus 260B without transmitting the control signal to the S-MMS controller 420. Alternately, the security processor 450A may operate simply as a connection between the communication busses 260A and 260B and not intercept any control signals. Additionally, control signals intercepted by the security processor 450A from the communication bus 260B may be transmitted directly to the communication bus 260A by the security processor based on the message identifier of the control signal. In an example, a first control signal with a first message identifier indicating battery charge level may be deemed by the security processor 450A as not of use to the S-MMS controller 420, and the security processor 450A may then transmit the unmodified first control signal with the message identifier indicating battery charge level on the communication buss 260A. The security processor 350A processes the control signals received over the communication buses 260A and 260B to determine their message identifiers and determines which control signals to pass/transmit to the S-MMS controller 420 based on the message identifier in the control signals (message identifier based rules).

Because of the structure of this upgrade system of FIG. 5A, it can effectively be plugged straight into the original electronics (e.g. processing system) of an original not-upgraded motorized mobile chair and seamlessly intercept control signals transmitted by that electronics (e.g. processing system) of the motorized mobile chair, determine whether or not and/or how to modify those control signals or create new control signals, and transmit the modified, not modified, or new control signals to affect and control the operation of the now upgraded motorized mobile chair (including navigation control) without physically modifying the original electronics (e.g. processing system) of that motorized mobile chair. The now upgraded motorized mobile chair is augmented with additional functionalities, but the original motors, user interface, and other original control systems of the motorized mobile chair remain in the now upgraded motorized mobile chair. This results in a significant advancement in the overall operations, safety, and user specific customizations of the now upgraded motorized mobile chair without removing or wholesale replacing the original electronics of the motorized mobile chair and also results in a cost effective way to provide those new and advanced operations, safety, and user specific customizations.

In one example operation using the CAN communication bus 260A, the CAN communication bus 260B, and CAN formatted communications, the user interface for a motorized mobile chair 303 is a joystick or other direction and/or speed providing device, such as a head array, switch array, sip-n-puff system, or other alternative drive. A user moves the joystick or other direction and/or speed providing device to move the motorized mobile chair 303 in a direction and/or at a speed. The HMI processor 210 receives the user input from the joystick or other direction and/or speed providing device, converts that user input to direction and/or speed data, and creates and transmits a CAN formatted control signal over the communication bus 260A with a message identifier of the HMI processor and/or joystick data type and the direction and/or speed data.

In one example, the direction and/or speed data is a vector for direction and/or speed selected by the joystick or other direction and/or speed providing device. In another example, the direction and/or speed data are XX and YY inputs from the joystick or other direction and/or speed providing device (where XX is an x position of the joystick or other direction and/or speed providing device and YY is a y position of the joystick or other direction and/or speed providing device representative of direction and/or speed selected by the joystick or other direction and/or speed providing device). In another example, the direction and/or speed data are XX and YY inputs (where XX and YY is a vector for direction and/or speed selected by the joystick or other direction and/or speed providing device). In another example, the direction and/or speed data are XX and YY inputs (where XX is an x axis position of the joystick or other direction and/or speed providing device and YY is a y axis position of the joystick or other direction and/or speed providing device, which are representative of direction and/or speed selected by the joystick or other direction and/or speed providing device, and in which XX is a number between −100 and 100 for the x axis position of the joystick and YY is a number between −100 and 100 for the y axis position of the joystick). In another example, the direction and/or speed data are forward/back inputs and left/right inputs (e.g. XX and YY inputs where XX is a number representing the proportion of left or right input to the direction and/or speed providing device and YY is a number representing the proportion of forward or back input to the direction and/or speed providing device).

The security processor 450A receives the control signal transmitted from the HMI processor 210 over the communication bus 260A, processes the control signal to determine its message identifier, determines the message identifier of the control signal is the type of message identifier for which it is programmed to act, and acts on the control signal. In this example, the security processor 450A transmits the control signal to the S-MMS controller 420 operating on the S-MMS processor 430.

The S-MMS controller 420 operating on the S-MMS processor 430 receives the control signal from the security processor 450A and acts on it. In one example, the S-MMS controller 420 operating on the S-MMS processor 430 processes all or the majority of control signals received from the security processor 450A, which may be processed differently based on the control signal. In this example, the S-MMS controller 420 operating on the S-MMS processor 430 reads the data in the control signal (e.g. the X and Y inputs). The S-MMS controller 420 also processes its sensor data and determines, based at least in part on its processed sensor data (in one example), whether to modify the original control signal from the HMI processor 210, not modify the original control signal from the HMI processor, or create a new control signal.

For example, the S-MMS controller 420 may determine an object is in the direction of travel identified by the direction and/or speed data in the original control signal from the HMI processor 210, or otherwise proximate to the motorized mobile chair 303 and either (1) change the direction and/or speed data to new direction and/or speed data, and transmit the modified control signal with the new direction and/or speed data to the security processor 450A or (2) create a new control signal with the new direction and/or speed data in the new control signal and transmit the new control signal to the security processor.

In another example, the S-MMS controller 420 may determine an object is in the direction of travel identified by the direction and/or speed data in the original control signal from the HMI processor 210, or otherwise proximate to the motorized mobile chair 303 and either (1) change the X and Y input data to new X and Y input data and transmit the modified control signal with the new X and Y input data to the security processor 450A or (2) create a new control signal with the new X and Y input data as the data in the new control signal and transmit the new control signal to the security processor. In one example, the one or more modified or new control signals are formatted at least with a message identifier and the data/payload.

In another example, the S-MMS controller 420 may determine the motorized mobile chair 303 should reduce its speed, stop, increase its speed, turn, or otherwise maneuver. The determination may be made, for example, by the S-MMS controller 420 processing one or more sensor reports from one or more sensor modules and determining there is an object, drop, steep incline or decline, or other threat in the selected direction and/or speed of travel identified in a control signal. The S-MMS controller 420 may either change data in one or more received control signals to cause the drive processor 230 or another component of the motorized mobile chair 303 to implement the determined maneuver or create one or more new control signals to cause the drive processor or another component of the motorized mobile chair to implement the determined maneuver and transmit the one or more modified control signals or one or more new control signals to the security processor 450A. In one example, the one or more modified or new control signals are formatted at least with a message identifier and the data/payload. The control signals may optionally include identification of the sending device, an identification of the message type or message content, or message priority.

The security processor 450A receives the one or more modified control signals or one or more new control signals from the S-MMS controller 420 operating on the S-MMS processor 430. In one embodiment, the security processor 450A does not separately process the one or more received control signals and simply transmits them onto the communication bus 260B. In another embodiment, the security processor 450A does not separately process the one or more received control signals and simply transmits them onto both communication buses 260A and 260B. In another embodiment, the security processor 450A processes the one or more received control signals to determine their message identifier, determines the message identifier of the control signals is the type of message identifier for which it is programmed to act, and acts on the control messages by transmitting the control signals onto the communication bus 260B.

In another example, the security processor 450A receives the one or more modified control signals or one or more new control signals from the S-MMS controller 420 operating on the S-MMS processor 430. The security processor 450A processes the one or more received control signals to determine their message identifier and use that message identifier to determine which one of the two communication buses 260A or 260B to transmit the modified, not modified, or new control signal and transmits the modified, not modified, or new control signal on the determined communication bus.

In one example of this embodiment, the drive processor 220 receives the one or more modified control signals or new control signals transmitted from the security processor 450A over the communication bus 260B, processes the control signals to determine their message identifier, determines the message identifier of the control signals is the type of message identifier for which it is programmed to act, and acts on the data contained in the control signals. In this example, the drive processor 220 reads the direction and/or speed data (e.g. the X and Y input data in one example), and causes the motor to drive or otherwise move the motorized mobile chair 303 in the direction and/or speed corresponding to the direction and/or speed data. In another example, after the drive processor 220 reads the direction and/or speed input data (e.g. the X and Y input data in one example) from the control signal, the drive processor calculates the proper power/voltage level to transmit to one or more motors of the motorized motor chair 303 (depending on the model of the motorized motor chair) to move the motorized mobile chair in the direction and/or speed corresponding to the direction and/or speed data identified in the control signal data, and outputs the determined power/voltage level or a control signal identifying the power/voltage level to the one or more motors.

In another example, the drive processor 220 reads the data in a control signal, determines the data is to cause the motorized motor chair 303 to stop, to reduce speed, to increase speed, to turn, or to otherwise maneuver. The drive processor 220 determines the proper power/voltage level to transmit to one or more motors of the motorized motor chair 303 to stop the motorized mobile chair, to reduce the speed of the motorized mobile chair, to increase the speed of the motorized mobile chair, to turn the motorized mobile chair, or to otherwise maneuver the motorized mobile chair. The drive processor 220 outputs the determined power/voltage level or a control signal identifying the power/voltage level to the one or more motors.

Control signals transmitted from the power processor 220, the drive processor 230, the seating processor 240, and/or the application processor 250 are similarly received and processed by the security processor 450A and subsequently transmitted to and processed by the S-MMS controller 420. Control signals processed by the S-MMS controller 420 and subsequently transmitted by the S-MMS controller to the security processor 450A are also similarly processed by the security processor (as necessary) and transmitted by the security processor to the power processor 220, the drive processor 230, the seating processor 240, and/or the application processor 250 over the communication bus 260A or the communication bus 260B, as the case may be. The power processor 220 processes and acts on the data/payload of a control message for which it is programmed to act (e.g. when the message identifier is the type of message identifier on which it is programmed to act), the drive processor 230 processes and acts on the data/payload of a control message for which it is programmed to act (e.g. when the message identifier is the type of message identifier on which it is programmed to act), the seating processor 240 processes and acts on the data/payload of a control message for which it is programmed to act (e.g. when the message identifier is the type of message identifier on which it is programmed to act), and/or the application processor 250 processes and acts on the data/payload of a control message for which it is programmed to act (e.g. when the message identifier is the type of message identifier on which it is programmed to act).

Of course, and as indicated above, the S-MMS controller 420 operating on the S-MMS processor, the security processor 450A, optionally the communication processor 470, and the power processor 220, the drive processor 230, the seating processor 240, and the optional application processor 250 may operate using and according to one or more other wired or wireless protocols, process control signals according to those protocols, and transmit and receive control signals according to those protocols. For example, a control signal may be formatted with a destination device identification, an originating device identification, a message type or other message identifier, and data/payload. The examples above would be adapted for the specific other type of protocol, such as by transmitting, receiving, intercepting, processing, and/or routing control signals based on a destination device identification, an originating device identification, a message type or other message identifier and/or processing the data/payload of all received control signals or processing data/payload of control signals based on the destination device identification, the originating device identification, the message type or other message identifier.

FIG. 5A depicts a non-limiting example embodiment of an upgrade processing system 510 that interfaces to hardware components of a motorized mobile chair 202. That is, the embodiment of FIG. 5A depicts an upgrade processing system 510 that interfaces to one or more communication buses 260A and 260B (or a single communication bus) to communicate with the HMI processor 210, the seating processor 220, the drive processor 230, the seating processor 240, and/or the application processor 250 of the motorized mobile chair 202.

Alternative embodiments include an upgrade processing system 510 that does not separate the communication bus of the motorized mobile chair such that communication busses 260A and 260B are connected or an upgrade processing system 510 which uses a relay or similar device to intermittently open and close the communication bus 260A and/or 260B, which may be controlled by the S-MMS controller 420 via one or more control signals sent by the S-MMS controller to the relay. In some embodiments, one or more sensor processors may communicate with the S-MMS controller 420 through the bus 260A and/or the bus 260B. The functions of the S-MMS processor 430 and the security processor 450A may be performed by a single processor or multiple processors in some embodiments.

The upgrade processing system 510, and more specifically the S-MMS processor 430 and the S-MMS controller 420, further perform the functions and operations as the S-MMS processors and S-MMS controllers described in co-pending U.S. patent application Ser. No. 15/880,663, entitled Secure Systems Architecture for Integrated Motorized Mobile Systems, filed Jan. 26, 2018, U.S. patent application Ser. No. 15/880,686, entitled Federated Sensor Array for Use with a Motorized Mobile System and Method of Use, filed Jan. 26, 2018, and U.S. patent application Ser. No. 15/880,699, entitled System and Methods for Sensor Integration in Support of Situational Awareness for a Motorized Mobile System, filed Jan. 26, 2018, and U.S. patent application Ser. No. 16/101,152, entitled Systems and Methods for Enhanced Autonomous Operations of a Motorized Mobile System, filed on Aug. 10, 2018, the entire contents of which are incorporated herein in their entirety.

Figure 5C:
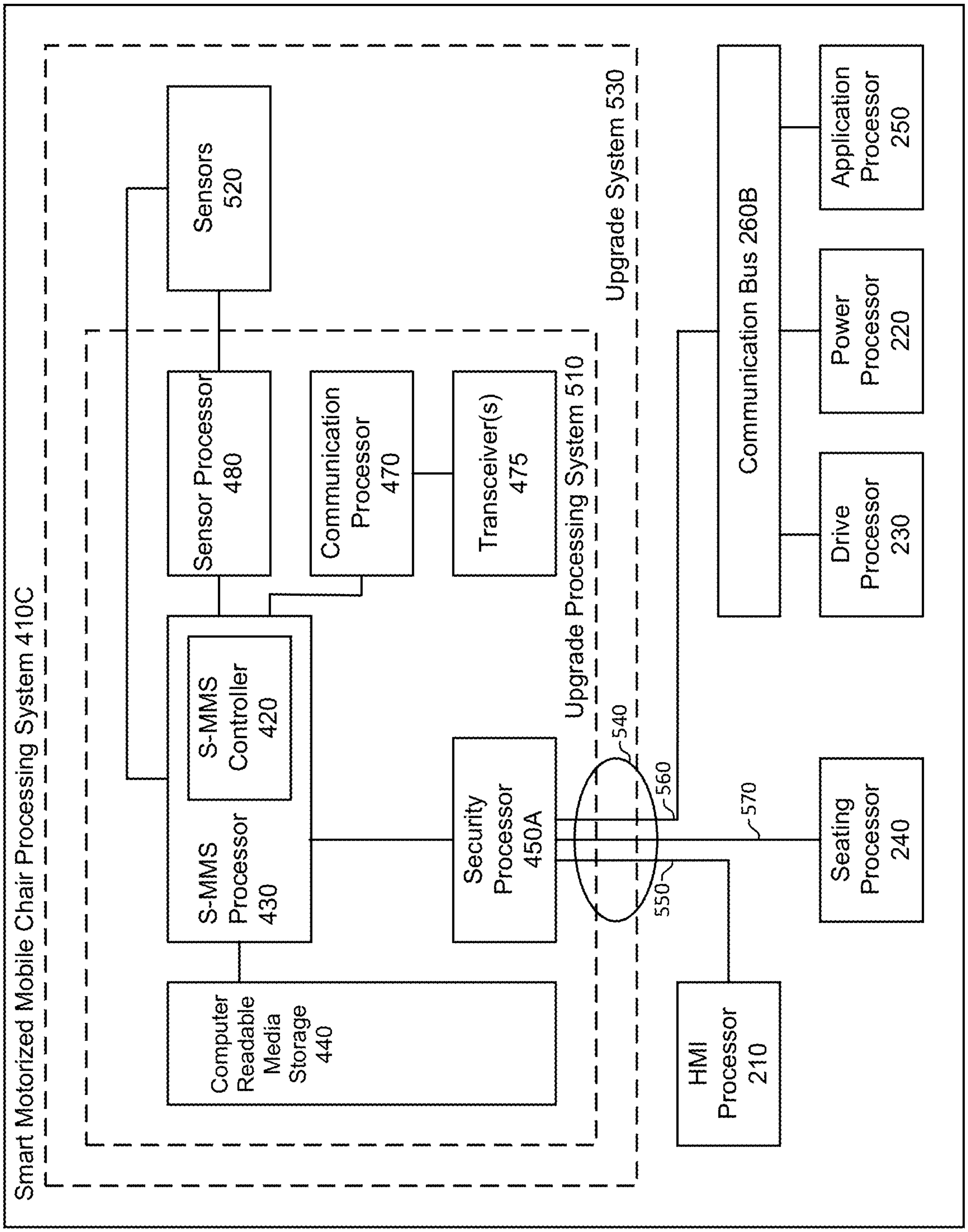

As described above, in the embodiment of FIG. 5A, the HMI processor 210 and the seating processor 240 connect to the first communication bus 260A, and the power processor 220, the drive processor 230, and the optional application processor 250 connect to the second communication bus 260B. However, in another embodiment, the seating processor 240 or HMI processor 210 may additionally be connected to and communicate via the communication bus 260B. Additionally or alternatively, one or more of the power processor 220, the drive processor 230, and/or the optional application processor 250 may be connected to and communicate via the communication bus 260A. In another example, all of the HMI processor 210, the seating processor 220, the drive processor 230, the seating processor 240, and the optional application processor 250 are connected to and communicate via a single communication bus, such as a combination of the communication buses 260A and 260B. For example, in the embodiment of FIG. 5B, the HMI processor 210 connects to the first communication bus 260A or directly to the security processor 450A via connection 550, and the power processor 220, the drive processor 230, the seating processor 240, and the optional application processor 250 connect to the second communication bus 260B. In the embodiment of FIG. 5C, the HMI processor 210 and the seating processor 240 directly connect to the security processor 450A via connections 550 and 570, and the power processor 220, the drive processor 230, and the optional application processor 250 connect to the communication bus 260B. In the embodiment of FIG. 5C, the communication bus 260A is not present.

Frame and Sensors

Situational awareness is the ability to be cognizant of oneself/itself in a given space. It is an organized knowledge of objects and state kinematics in relation to oneself/itself in a given space or scenario. Situational awareness also involves understanding the relationship of these objects when there is a change of position or kinematic state of one or more of the objects. The kinematic state of an object may include position, distance, heading, trend, altitude, velocity, and/or acceleration relative to a baseline. The one or more sensor modules of the upgrade system 302 are placed around the motorized mobile chair to provide sensor coverage sufficient for situational awareness by the upgrade processing system 510 and for the upgrade processing system to further achieve the navigation goals of the upgrade processing system, including collision avoidance and stability management.

Figure 6:
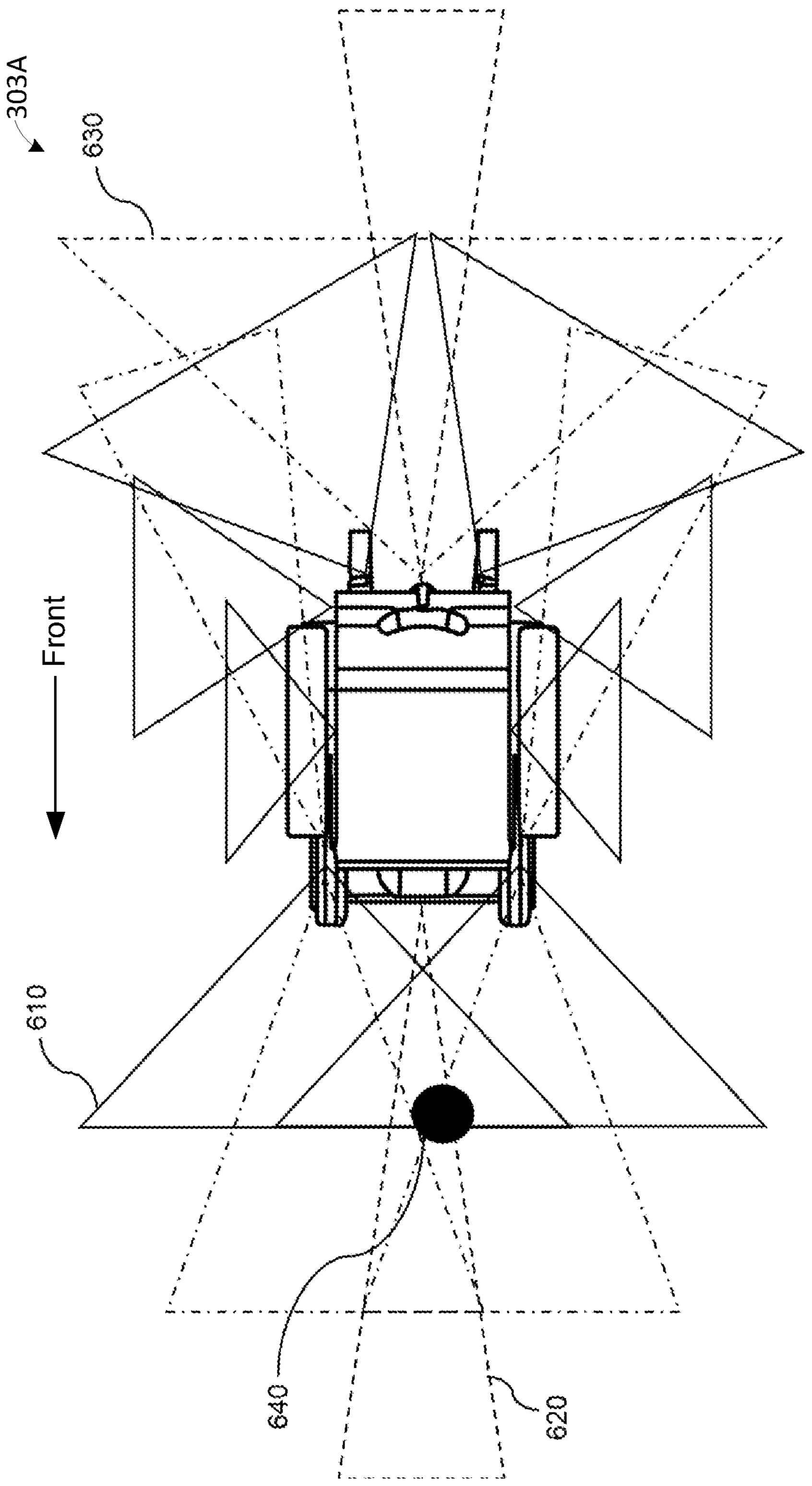
FIG. 6 depicts an embodiment of a smart motorized mobile chair consisting of a front-wheel drive motorized mobile chair equipped with an upgrade system having a plurality of object detection sensors.

FIG. 6 depicts an embodiment of a smart motorized mobile chair 303A consisting of a front-wheel drive motorized mobile chair equipped with an upgrade system having a plurality of object detection sensors. The upgrade system of FIG. 6 includes an embodiment of object detection sensor arrays to cover three main types of sensor coverage zones, including zones 610 (zones with solid lines), zones 620 (zones with dashed lines), and zones 630 (zones with dash-dot lines). A sensor array is one or more sensors in one or more sensor modules. In one example, a sensor array includes multiple sensors positioned to take sensor measurements in a selected area or zone of coverage. The depicted sensor coverage zones 610, 620, 630 of FIG. 6 are covered using three main sensor arrays, including five forward sensors, five rearward sensors, and six side sensors (three for each side) generally aimed to cover the range of motion of the motorized mobile chair 303A and toward the blind spots of a user. The sensors may be arranged to take sensor readings (e.g. measurements) on the area proximate to the smart motorized mobile chair 303A. Additionally or alternatively, the sensors may be arranged to take sensor readings on the terrain (e.g. ground) proximate to the smart motorized mobile chair 303A.

The depicted sensor arrays are composed of a mix of (a) short-range sensors such as short-range LIDAR, SONAR, infrared, time-of-flight cameras and RADAR sensors for zones 610 with solid lines, (b) long-range sensors such as long-range LIDAR and RADAR sensors for zones 620 with dashed lines, and (c) image capturing sensors (including still images and/or video, stereo vision, and computer vision sensors referred to generally as imagers) such as cameras for zones 630 with dash-dot lines. Generally, short-range sensors have wider fields of view (FOV), while long-range sensors have narrower fields of view. The sensor array of FIG. 6 may be characterized as an overlapping, large FOV (with both narrow and wide FOVs), sensor array. The sensor placement, number of sensors used, and types of sensor reports expected from sensors in the depicted embodiment are used as a non-limiting example. More or fewer sensors of varying types may be used.

One or more single sensor units may have the ability to act in both short and long-range modes. One or more single sensor units may have the ability to measure objects and measure or map the terrain proximate to the smart motorized mobile chair 303A. One or more sensors and sensor types may be selected for a desired smart motorized mobile chair 303A architecture and user. As an example, if the user is a quadriplegic and spends most of their time indoors in a relatively slow-moving smart motorized mobile chair, the sensor arrays may be comprised of all short-range sensors, with multiple overlapping FOVs, where the time to impact on a close-in maneuvering object is much more critical than a vehicle on the horizon. Alternatively or additionally, the sensor array would be adjusted if fitted to alternative drive configurations, such as a center or rear-wheel drive smart motorized mobile chair.

Figure 7:
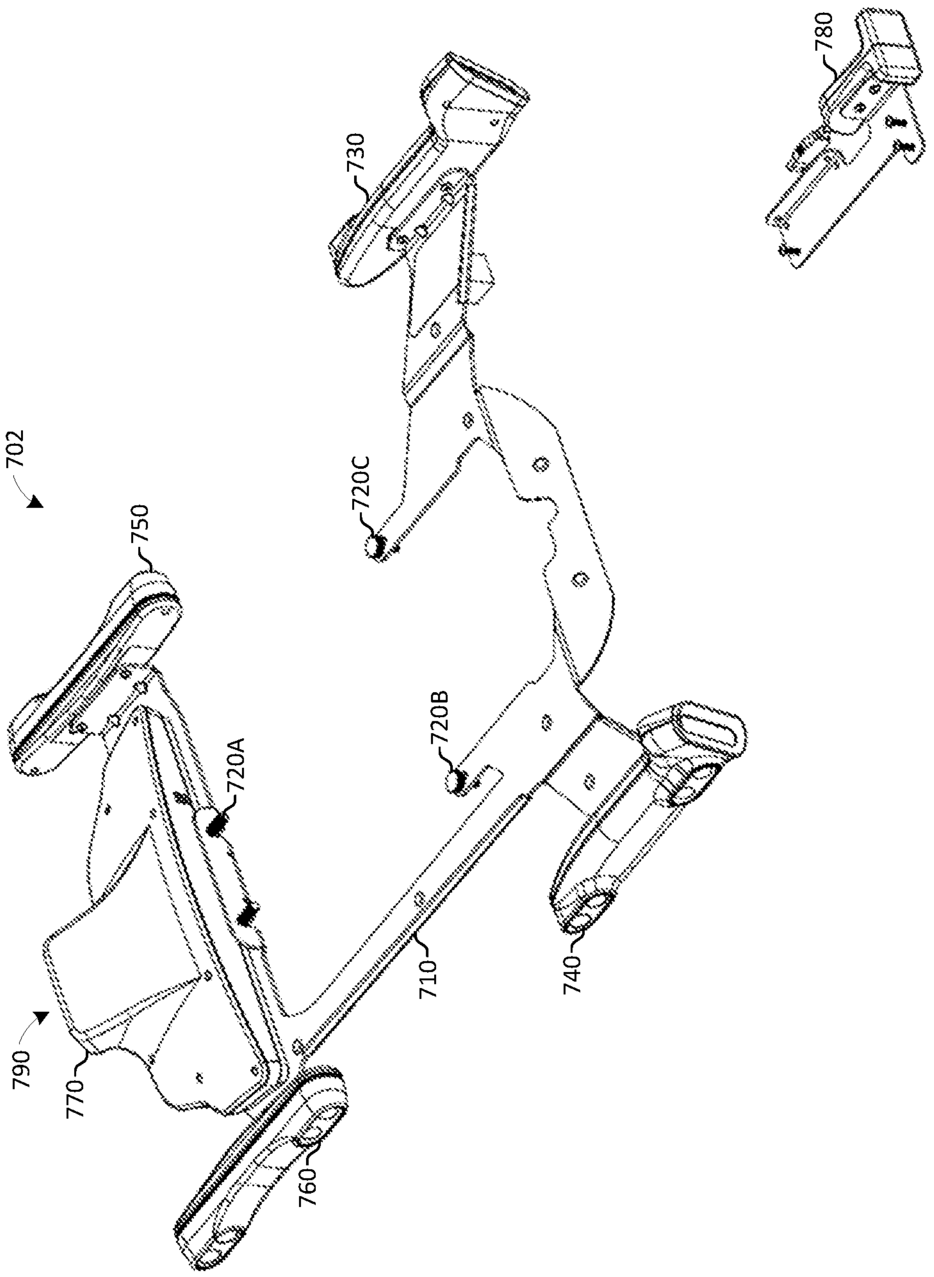
FIG. 7 depicts an embodiment of a frame and sensor modules to upgrade a motorized mobile chair to a smart motorized mobile chair.

FIG. 7 depicts an embodiment of a frame and sensor modules to upgrade a motorized mobile chair to a smart motorized mobile chair. The upgrade system 702 includes a frame 710 attachable at one or more attachment points of the frame (e.g. frame attachment points 720A-720C) to a structure of a motorized mobile chair 303, such as the base or chassis of the motorized mobile chair. Each of the one or more attachment points 720A-720C provides constraint for the upgrade system 702 frame 710, such that the frame is located in a fixed position relative to the structure (e.g. base) of the motorized mobile chair. Additionally, the one or more attachment points 720A-720C may be selected to isolate the frame 710 from strain or deformation in the structure of the motorized mobile chair to which the frame is attached. In one embodiment, the frame 710 is a unitary structure (i.e. one single frame structure not assembled from separate frame components). In another embodiment, the frame 710 is a unitary substrate.

The upgrade system 702 further comprises a plurality of object detection sensors, which may be grouped in sensor modules 730, 740, 750, 760, and 770 attached to the frame 710. An independent sensor module 780 may be attached to the frame 710, the base or chassis of the motorized mobile chair 303, or a footrest or other structure of the motorized mobile chair. At least one processing unit 790, which includes one or more processors (e.g. the processors of FIG. 4 or the upgrade processing system 510 FIG. 5), is attached directly or indirectly to or integrated with the frame 710. The one or more processors of the processing unit 790 are in communication with the object detection sensors of the sensor modules 730, 740, 750, 760, 770, and 780, such as by wired connections or wireless communication. The processing unit 790 includes and operates the same as the upgrade processing system 510 of FIG. 5. However, in one embodiment, the processing unit 790 also houses the sensor module 770. In another embodiment, the processing unit 790 does not house the sensor module 770 and that sensor module is enclosed in a separate housing that is attachable to either the processing unit 790 or the frame 710.

The orientation and rotation of a rigid body in space are determined by six degrees of freedom (x translation, y translation, z translation, pitch, roll, and yaw). The frame 710 of the upgrade system 702 is designed to fix all six degrees of freedom of the processing unit 790 (which, in one example, is the same as the upgrade processing system 510) to the main base structure or chassis of the motorized mobile chair 303A (reference FIG. 3).

In one example, three or more attachment points 720A-720C from the frame 710 to the motorized mobile chair 303A base structure or chassis are used to fully fix the frame to the motorized mobile chair. In the example of FIG. 7, there are three mounting locations 720A-720C, each of which mount to the motorized mobile chair 303A using one or more fixtures, where a fixture may be a screw, bolt, rivet, permanent adhesive, temporary adhesive, fit (e.g. press fit), or other attachment mechanism. However, there may be other numbers of attachment points (more or less) in other embodiments.

One or more sensor modules of an upgrade system 702 may be mounted independently of the frame 710. In an example, a sensor module 780 (e.g. a RADAR sensor as an example) is attached to a foot rest of the motorized mobile chair 303A to provide a more complete sensor coverage, including for situational awareness. Additionally or alternatively, remote or independent sensor modules (i.e. sensor modules not mounted on the frame 710) may be used to accommodate the available mechanical mounting provisions (e.g. a device, structure, component, or composition (e.g. adhesive) or a portion thereof) of the motorized mobile chair 303A, to monitor user health attributes, and/or to augment the coverage of the primary upgrade system sensor modules. Non-limiting examples of monitoring user health attributes include measuring user presence in the motorized mobile chair with one or more sensors, measuring user heart rate with one or more sensors, measuring user respiratory rate with one or more sensors, measuring moisture in a seat with one or more sensors, and/or measuring user weight or weight distribution in the seat with one or more sensors.

The sensor modules 730, 740, 750, 760, 770, and 780 may be standardized and used with a variety of different frames 710 to create unique upgrade systems for different motorized mobile chairs 110. In an embodiment, the upgrade processing system 702 includes a reconfigurable system of sensor modules 730-780 fixed to a frame 710, such as a unitary frame (i.e. one single frame structure not assembled from separate frame components) or unitary substrate. In another embodiment, the frame 710 is made of multiple separate pieces or frame structures (i.e. not a unitary frame) and assembled into the frame.

The sensor modules 730, 740, 750, 760, 770, and 780 are connected to the processing unit 790 via wired and/or wireless connections. In one example, the sensor modules 730, 740, 750, 760, and 770 are connected to the processing unit 790 via wired connections, such as over a communication bus or via one or more wires. Though, the sensor modules 730, 740, 750, 760, and 770 could instead communicate with the processing unit 790 via wireless connections and communications, such as through an onboard wireless communication transceiver or processor/transceiver combination. In another example, the sensor module 780 communicates with the processing unit 790 via wireless connections and communications, such as through an onboard processor and wireless communication transceiver. Though, the sensor module 780 could connect to the processing unit 790 via one or more wired connections, such as over a communication bus or via one or more wires.

In one example, fixing the frame 710 to the chassis of the motorized mobile chair 303A results in both the processing unit 790/upgrade processing system 510 and the motorized mobile chair to move synchronized together in space. In this way, the processing unit 790/upgrade processing system 510 is able to synchronize a point of origin or operation of the processing unit/upgrade processing system to a point of origin or operation of the motorized mobile chair 303A base structure or chassis for various operations of the processing unit/upgrade processing system.

In another example, fixing the frame 710 to the chassis of the motorized mobile chair 303A in at least three locations results in fixing the frame relative to a reference point on the chassis of the motorized mobile chair. When the sensor modules 730-770 and the processing unit 790/upgrade processing system 510 are then fixed to the frame 710 in known locations, the processing unit/upgrade processing system is preprogrammed with those known locations and/or 1) distances between origins of coordinate systems for the sensors of the sensor modules 730-770 and the reference point on the chassis of the motorized mobile chair 303A and 2) distances between origins of coordinate systems for the processing unit/upgrade processing system and the reference point on the chassis of the motorized mobile chair. The processing unit 790/upgrade processing system 510 also is programmed with angles that are the amounts of rotation about defined axes to align the orientation of one coordinate system (e.g. the coordinate system of the sensors of the sensor modules 730-770) with the orientation of another coordinate system (e.g. the coordinate system of the reference point on the chassis of the motorized mobile chair 303A). These distances and angles are then used by the processing unit 790/upgrade processing system 510 to translate sensor reports from coordinate systems of the sensors in the sensor modules to the coordinate system of the processing unit/upgrade processing system.

Alternately, each sensor module 730-770 may have an orientation and/or position sensor to determine its orientation and/or position and transmit that orientation and/or position to the processing unit 790/upgrade processing system 510 in sensor reports it transmits. The processing unit 790/upgrade processing system 510 may then use that orientation and/or position in the sensor report to translate sensor data in that sensor report from the coordinate system of that corresponding sensor module 730-770 to the coordinate system of the coordinate system of the reference point on the chassis of the motorized mobile chair 303A or the processing unit/upgrade processing system.

The sensor modules 730, 740, 750, 760, 770, and 780 each take measurements or otherwise sense data relative to a sensor reference frame. Each sensor in a sensor module 730, 740, 750, 760, 770, and 780 has its own sensor reference frame. All data from the sensor is reported with reference to its sensor reference frame. A sensor reference frame extends from the center of an aperture or receptor (e.g. lens, antenna, etc.) of the sensor of the sensor module. For example, the x-axis of each sensor extends orthogonal to the direction of travel of the motorized mobile chair 303 and indicates roll attitude of that sensor, the y-axis of the sensor extends in the direction of travel of the motorized mobile chair and indicates the pitch axis of that sensor, and the z-axis of the sensor extends vertically through the center of the sensor and indicates the yaw of that sensor.

The processing unit 790/upgrade processing system 510 of the motorized mobile chair 303 has a reference frame relative to a reference point of the motorized mobile chair. In one example, the processing unit 790/upgrade processing system 510 reference frame may be an x-axis, y-axis, and z-axis of a reference point on the motorized mobile chair 303 chassis. In another example, the processing unit 790/upgrade processing system 510 reference frame may be fixed to a reference point on the motorized mobile chair 303 chassis in which the x-axis extends from left to right of the reference point on the motorized mobile chair and is parallel to the front of the motorized mobile chair, the y-axis is perpendicular to the x-axis extending forward from the reference point in the direction of travel of the motorized mobile chair, and the z-axis is orthogonal to the x and y-axis and vertical through the intersection of the x and y axes at the reference point. Alternately, the processing unit 790/upgrade processing system 510 reference frame may be an x-axis, y-axis, and z-axis of a reference point of the processing unit/upgrade processing system. As with the sensor reference frames, the x, y, and z-axes of the processing unit 790/upgrade processing system 510 reference frame represent roll, pitch, and yaw measurements.

In one example, the processing unit 790/upgrade processing system 510 establishes a uniform Cartesian coordinate system extending from a motorized mobile chair reference frame, which in this case is fixed to a reference point on the motorized mobile chair 303. In this example, the x, y, and z translation distances and pitch, yaw, and roll angles required to translate the sensor frame of reference for each sensor of the upgrade system to the uniform Cartesian coordinate system extending from a motorized mobile chair reference frame are stored in memory of the motorized mobile chair (e.g. computer readable media storage 440). In this example, a translation distance is the distance from the origin of one coordinate system to the origin of another coordinate system along a defined axis. The pitch, yaw, and roll angles required to translate the sensor frame of reference for each sensor of the upgrade system to the uniform Cartesian coordinate system are the amounts of rotation about defined axes that are required to align the orientation of one coordinate system with the orientation of another coordinate system.

All data received by the processing unit 790/upgrade processing system 510 may be translated by the processing unit/upgrade processing system from the reference frame of the data (e.g. the reference frame of the device that sensed, measured, collected, and/or transmitted and/or otherwise generated the data) to the motorized mobile chair reference frame. The location and orientation information for the reference frame of the device that sensed, measured, collected, and/or transmitted and/or otherwise generated the data may be stored in memory of the motorized mobile chair (e.g. computer readable media storage 440) or determined from orientation and/or position data of the device that is transmitted from the device, including with data from the device or before or after transmitting the data from the device.

For example, the processing unit 790/upgrade processing system 510 receives sensor reports with sensor report data about one or more objects from one or more of the sensor modules 730, 740, 750, 760, 770, and 780. When the processing unit 790/upgrade processing system 510 receives sensor report data from the sensor modules 730, 740, 750, 760, 770, and 780 and that sensor report data is in polar coordinates (i.e. range and bearing to objects), the processing unit/upgrade processing system first translates the sensor report data from polar coordinates into Cartesian coordinates. Then, the processing unit 790/upgrade processing system 510 translates (e.g. converts) the sensor report data from the sensor reference frame (of the sensor module from which the sensor report was received) to the motorized mobile chair reference frame. After this translation, the sensor data and the processing unit 790/upgrade processing system 510 have the same relative reference frame. The processing unit 790/upgrade processing system 510 performs these steps repeatedly to each sensor report received from each sensor module 730, 740, 750, 760, 770, and 780.

After this translation, the sensor data and the processing unit 790/upgrade processing system 510 have the same relative reference frame, resulting in a higher confidence and more precise determination of threats (e.g. objects) and their locations by the processing unit/upgrade processing system and enabling more precise navigation operations in relation to those threats by the processing unit/upgrade processing system, including obstacle avoidance and stability management. The processing unit 790/upgrade processing system 510 then further processes the translated sensor data along with any user inputs from the HMI processor 210 or other data (if any) to determine if the processing unit/upgrade processing system should perform one or more navigation operations, including collision avoidance and stability management, and generate one or more control signals to effect that navigation operation. In some instances, the processing unit 790/upgrade processing system 510 further processes the translated sensor data without any user inputs from the HMI processor 210 to determine if it should perform one or more navigation operations, including collision avoidance, and generates one or more control signals to effect that navigation.

In another example, the processing unit 790/upgrade processing system 510 establishes a uniform Cartesian coordinate system extending from a processing unit/upgrade processing system reference frame, which in this case is fixed to a reference point of the processing unit/upgrade processing system. All data received by the processing unit 790/upgrade processing system 510 may be translated by the processing unit/upgrade processing system to the processing unit/upgrade processing system reference frame. The processing unit 790/upgrade processing system 510 receives sensor reports with sensor report data about one or more objects from one or more of the sensor modules 730, 740, 750, 760, 770, and 780. When the processing unit 790/upgrade processing system 510 receives sensor report data from the sensor modules 730, 740, 750, 760, 770, and 780 and that sensor report data is in polar coordinates (i.e. range and bearing to objects), the processing unit/upgrade processing system first translates the sensor report data from polar coordinates into Cartesian coordinates. Then, the processing unit 790/upgrade processing system 510 translates (e.g. converts) the sensor report data from the sensor reference frame (of the sensor module from which the sensor report was received) to the processing unit/upgrade processing system reference frame. After this translation, the sensor data and the processing unit 790/upgrade processing system 510 have the same relative reference frame. The processing unit 790/upgrade processing system 510 performs these steps repeatedly to each sensor report received from each sensor module 730, 740, 750, 760, 770, and 780.

After this translation, the sensor data and the processing unit 790/upgrade processing system 510 have the same relative reference frame, resulting in a higher confidence and more precise determination of threats (e.g. objects) and their locations by the processing unit/upgrade processing system and enabling more precise navigation operations in relation to those threats by the processing unit/upgrade processing system, including obstacle avoidance and stability management. The processing unit 790/upgrade processing system 510 then further processes the translated sensor data along with any user inputs from the HMI processor 210 or other data (if any) to determine if the processing unit/upgrade processing system should perform one or more navigation operations, including collision avoidance and stability management, and generate one or more control signals to effect that navigation operation. In some instances, the processing unit 790/upgrade processing system 510 further processes the translated sensor data without any user inputs from the HMI processor 210 to determine if it should perform one or more navigation operations, including collision avoidance, and generates one or more control signals to effect that navigation.

In another example, a first sensor module 730, 740, 750, 760, 770, or 780 generates first sensor data about one or more objects with respect to a first sensor reference frame of the first sensor module and transmits the first sensor data to the processing unit 790/upgrade processing system 510. A second sensor module 730, 740, 750, 760, 770, or 780 generates second sensor data about one or more objects with respect to a second sensor reference frame of the second sensor module and transmits the second sensor data to the processing unit 790/upgrade processing system 510. The processing unit 790/upgrade processing system 510 receives the first sensor data from the first sensor module 730, 740, 750, 760, 770 and receives the second sensor data from the second sensor module. The processing unit 790/upgrade processing system 510 determines whether one or more of the first sensor data and second sensor data comprises polar coordinates. If any sensor data comprises polar coordinates, the processing unit 790/upgrade processing system 510 converts one or more of the first sensor data and second sensor data comprising polar coordinates to Cartesian coordinates. The processing unit 790/upgrade processing system 510 then translates the first sensor data from the first sensor reference frame to a Cartesian coordinate system of the motorized mobile chair reference frame and translates the second sensor data from the second sensor reference frame to the Cartesian coordinate system of the motorized mobile chair reference frame.

After this translation, the sensor data and the processing unit 790/upgrade processing system 510 have the same relative reference frame, resulting in a higher confidence and more precise determination of threats and their locations by the processing unit/upgrade processing system and more precise navigation operations in relation to those threats by the processing unit/upgrade processing system, including obstacle avoidance and stability management. The processing unit 790/upgrade processing system 510 then further processes the translated first sensor data and the translated second sensor data along with any user inputs from the HMI processor 210 or other data (if any) to determine if the processing unit/upgrade processing system should perform one or more navigation operations, including obstacle avoidance and stability management, and generate one or more control signals to effect that navigation. In some instances, the processing unit 790/upgrade processing system 510 further processes the translated first sensor data and the translated second sensor data without any user inputs from the HMI processor 210 to determine if it should perform one or more navigation operations, including obstacle avoidance and stability management, and generates one or more control signals to effect that navigation.

In this example, the drive processor 230 normally would generate (create) and transmit one or more control signals to maneuver the motorized mobile chair 303 relative to the motorized mobile chair reference frame or another reference point on or of the motorized mobile chair. Therefore, the processing unit 790/upgrade processing system 510 similarly generates (create) and transmits one or more control signals to maneuver the motorized mobile chair 303 relative to that same motorized mobile chair reference frame or another reference point on or of the motorized mobile chair.

Figure 8:
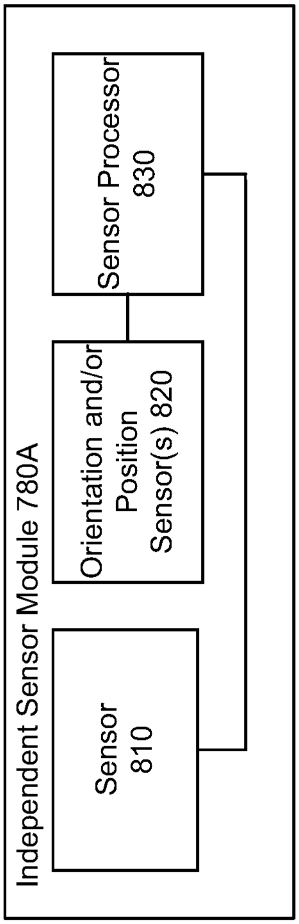
FIG. 8 depicts an independent sensor module of the upgrade system of FIG. 7.

FIG. 8 depicts an independent sensor module 780A of the upgrade system 702. When one or more independent sensor modules 780A are used to augment the sensor coverage of the primary sensor modules 730, 740, 750, 760, and 770 for object detection, the independent sensor module 780A comprises one or more object detection sensors 810, one or more orientation and/or position sensors 820, and one or more sensor processors 830. The inclusion of one or more orientation and/or position sensors 820 in the independent sensor module 780A enables an independent sensor module 780A to include the orientation and/or position data (identifying the orientation and/or position of the independent sensor module) with any sensor data it transmits. For example, the sensor processor 830 includes data identifying the orientation and/or location of the object detection sensor 810 in addition to object detection data in the sensor report or other communication 840 transmitted from the object detection sensor to the processing unit 790/upgrade processing system 510. In an embodiment, the orientation sensor of the independent sensor module 780 is a gyroscope, accelerometer, or inertial measurement unit (IMU), and orientation data from the orientation sensor is transmitted as part of the sensor report from the independent sensor module 780A to the processing unit 790. This capability allows for the tracking of orientation and/or position of different parts of the smart motorized mobile chair, such as the independent sensor module 780A.

The processor 830 of the independent sensor module 780 has a transceiver that may transmit or receive one or more control signals to or from one or more processors of the processing unit 790 via wired or wireless communications over wired or wireless connections. In an example, the one or more control signals, sensor reports, and/or other communications are transmitted and/or received by the transceiver via Bluetooth or Bluetooth Low Energy (BLE).

The processing unit 790/upgrade processing system 510 is able to process and/or combine sensor data from sensor reports of the independent sensor module 780A and data from sensor reports of the other sensor modules 730, 740, 750, 760, and 770 by using the position and/or orientation data included in the sensor reports and/or position and/or orientation data already known to the processing unit/upgrade processing system (such as stored in memory 440). In some instances, sensor reports from a sensor module 780A include position and/or orientation data from one or more position and/or orientation sensors associated with the sensor module. In other examples, a sensor module is fixed at a predetermined location on the frame and, therefore, its position and/or orientation relative to a reference frame of the motorized mobile chair 303 and/or the processing unit 790/upgrade processing system 510 is known. That position and/or orientation of the sensor module 780A is then used by the processing unit 790/upgrade processing system 510 to translate the sensor report data from the sensor module reference frame (of the sensor module from which the sensor report was received) to the motorized mobile chair reference frame or another reference frame on or of the motorized mobile chair 303.

Figure 9:
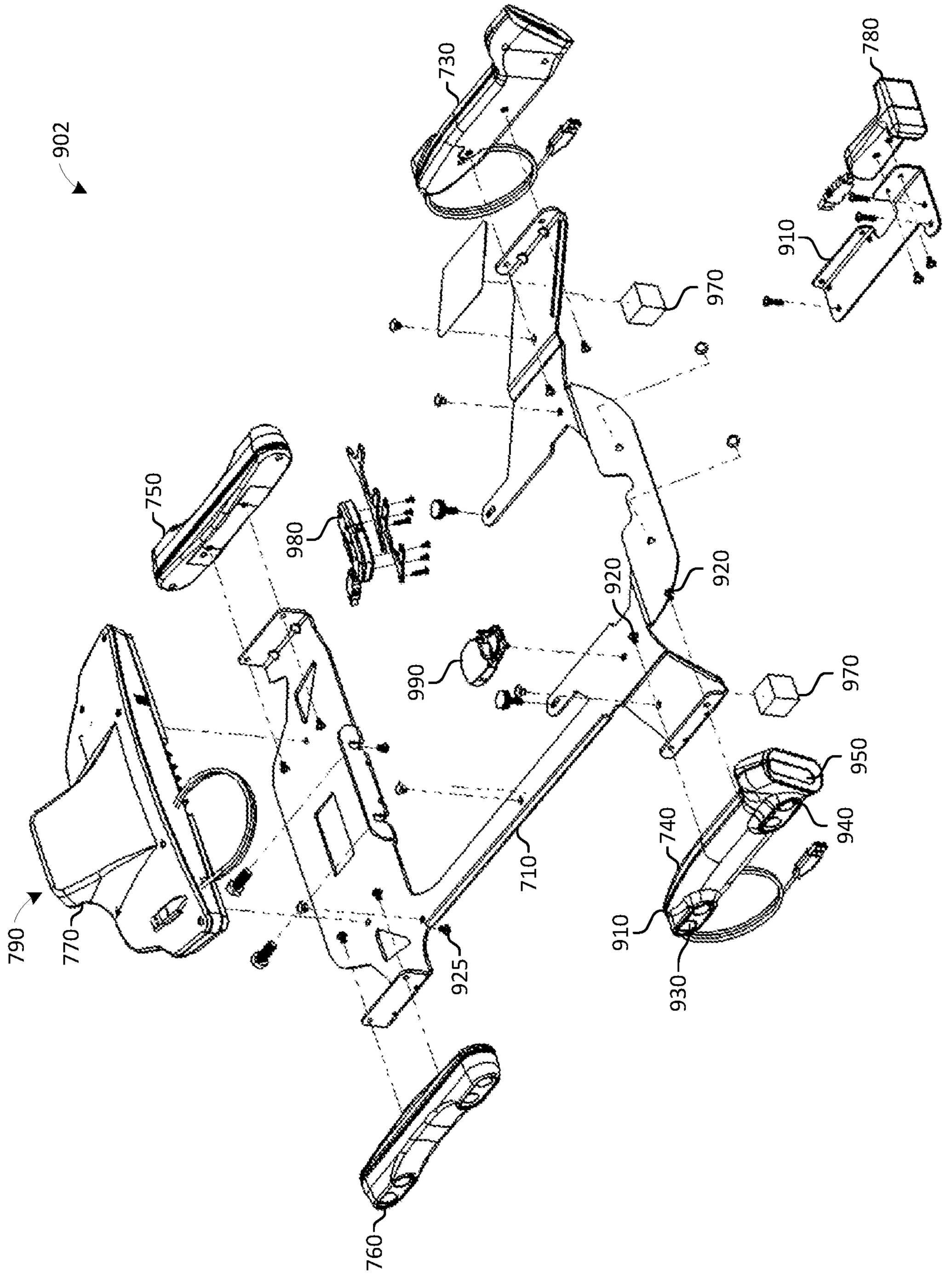
FIG. 9 depicts an embodiment of an upgrade system with a reconfigurable frame and standardized sensor modules.

FIG. 9 depicts an embodiment of an upgrade system 902 with a reconfigurable frame 710 and standardized sensor modules (e.g. 730, 740, 750, 760, 770, and 780), which may be used for quick redesign. The upgrade system 902 is a unit comprised of multiple components, including a frame 710, one or more sensor modules 730, 740, 750, 760, 770, and 780, and at least one processing unit 790.

In an exemplary embodiment, the frame 710 is a sheet metal frame or sheet metal weldment design to place the sensor modules 730, 740, 750, 760, and 770 in specific positions about the motorized mobile chair 303 to provide full sensor coverage for situational awareness. In other embodiments, the frame 710 may be made of plastic, metal, and/or fiber components or another material formed by or from a variety of processes, such as pressing, stamping, machining, injection molding, vacuum forming, and/or casting or another manufacturing process.

In any of the above frame embodiments, the frame 710 may be a unitary frame (i.e. one single frame structure). The unitary frame 710 enables easy and accurate installation of the sensor modules 730, 740, 750, 760, and 770 and optionally the processing unit 790 at orientations and positions known relative to a reference frame of the motorized mobile chair 303, which enables later processing of sensor reports by the processing unit after translating corresponding reference frames as discussed herein. Though, these known orientation and position configurations for the sensor modules 730, 740, 750, 760, and 770 and optionally the processing unit 790 also can be accomplished with a multi-piece frame when properly assembled so that positions and orientations of the sensor modules and the optionally the processing unit are known relative to a reference frame the motorized mobile chair 303 or when the sensor modules transmit orientation and/or position data as discussed herein. In other embodiments, the processing unit 790 does not translate sensor reference frames, and device orientation and position configurations can be more forgiving.

The one or more sensor modules 730, 740, 750, 760, 770, and 780 may be made of metal, plastic, fiber, or another material from one or more processes, such as machining, molding, and/or casting. In an exemplary embodiment, the sensor modules 730, 740, 750, 760, 770, and 780 are made of a combination of plastic molded housings, clear plastic or glass sensor lenses, and rubber held together with fixtures, such as screws, press fit components, and/or adhesive.

The sensor modules 730, 740, 750, and 760 are attached to the frame 710. One or more independent sensor modules 780 may be mounted to a bracket or mount 910 to assist in orienting, positioning, and/or attaching the independent sensor module to a part of the motorized mobile chair, such as under the foot rest or to the motorized mobile chair chassis.

The sensor modules 730, 740, 750, 760, 770, and 780 are connected to the processing unit 790 via wired and/or wireless connections. In one example, the sensor modules 730, 740, 750, 760, and 770 are connected to the processing unit 790 via wired connections, such as over a communication bus or via one or more wires. Though, the sensor modules 730, 740, 750, 760, and 770 could instead communicate with the processing unit 790 via wireless connections and communications, such as through an onboard wireless communication transceiver or processor/transceiver combination. In another example, the sensor module 780 communicates with the processing unit 790 via wireless connections and communications, such as through an onboard processor and wireless communication transceiver. Though, the sensor module 780 cold connect to the processing unit 790 via wired one or more connections, such as over a communication bus or via one or more wires.

The sensor modules 730, 740, 750, 760, 770, and 780 are configured to monitor and detect objects and obstacles within the smart motorized mobile chair proximate environment and may be comprised of combinations of short range, long range, and imager sensors (reference FIG. 6) including but not limited to RADAR sensors, SONAR sensors, LIDAR sensors, infrared sensors, imagers such as stereo vision sensors, time-of-flight cameras, and/or computer vision systems.

In the example upgrade system of FIG. 9, the front, right sensor module 740 mounts to the frame 710 with two fasteners 920 that provide orientation and positioning relative to the frame. Similar mounting provisions may be made with the other sensor modules 730, 750, 760, and 770 of the upgrade system 902. The processing unit 790 also mounts to the frame 710 with one or more fasteners 925 in the embodiment of FIG. 9.

The right front sensor module 740 contains a plurality of object detection sensors, including one or more SONAR sensors (e.g. 930, 940) and one or more imagers 950, such as a stereo vision camera pair. Additionally or alternatively, one or more sensor imagers 950 may be paired with an infrared projector. The front left sensor module 730 contains the same sensors as the front right sensor module 740 in the upgrade system 902 of FIG. 9. Though, the sensor modules 730 and 740 may contain different sensors from each other in other embodiments.

The right and left rear sensor modules 750 and 760 may include one or more RADAR sensors and one or more SONAR sensors. In the embodiment of FIG. 9, the processing unit 790 includes one or more sensor modules 770, such as one or more imagers, one or more SONAR sensors, and/or one or more orientation and/or position sensors (e.g. an inertial measurement unit or IMU).

The sensor placement, number of sensors used, and types of sensor reports expected in the depicted embodiment are used as a non-limiting example. More or fewer sensors of varying types may be used. In addition to sensor modules and the processing unit, other items may be mounted to the frame 710, such as one or more foam dampers 970.

One or more user interface (UI) modules may be used to receive user inputs and display, speak, sound, vibrate, or otherwise provide information to the user, including through haptic feedback. In an embodiment, a UI module 980 of the upgrade system 902 mounts to the HMI of the motorized mobile chair 303 and provides information on the status and functioning of the upgrade processing system 510 to the user, including through display, speech, sound, vibration, haptic feedback, or otherwise. In an embodiment, the UI module 980 integrates with the HMI processor 210 or the interface of the HMI of the motorized mobile chair 303. Additionally, the UI module 980 may include one or more user input devices, such as one or more buttons, touch pads, track pads, track balls, joy sticks, microphones, or other input devices.

The UI module 980 has a processor and an associated transceiver that may transmit or receive one or more control signals to or from one or more processors of the processing unit 790 via wired or wireless communications over wired or wireless connections. In an example, the one or more control signals, sensor reports, and/or other communications are transmitted and/or received by an associated transceiver via Bluetooth or Bluetooth Low Energy (BLE). In an embodiment, the orientation of the UI module 980 is measured by an onboard orientation sensor (e.g. a gyroscope, accelerometer or IMU) and transmitted as part of one or more communications to the processing unit 790.

The upgrade system 902 of FIG. 9 also includes a user presence sensor module 990 that is mounted in or to the seat cushion or on or to the seating assembly of the motorized mobile chair 303. The user presence sensor module 990 has a processor and an associated transceiver that may transmit or receive one or more control signals to or from one or more processors of the processing unit 790 via wired or wireless communications over wired or wireless connections. In an example, the one or more control signals, sensor reports, and/or other communications are transmitted and/or received by an associated transceiver via Bluetooth or Bluetooth Low Energy (BLE). In an embodiment, the orientation of the user presence sensor module 990 is measured by an onboard orientation sensor (e.g. a gyroscope, accelerometer or IMU) and transmitted as part of one or more sensor reports or other communications to the processing unit 790.

Figure 10:
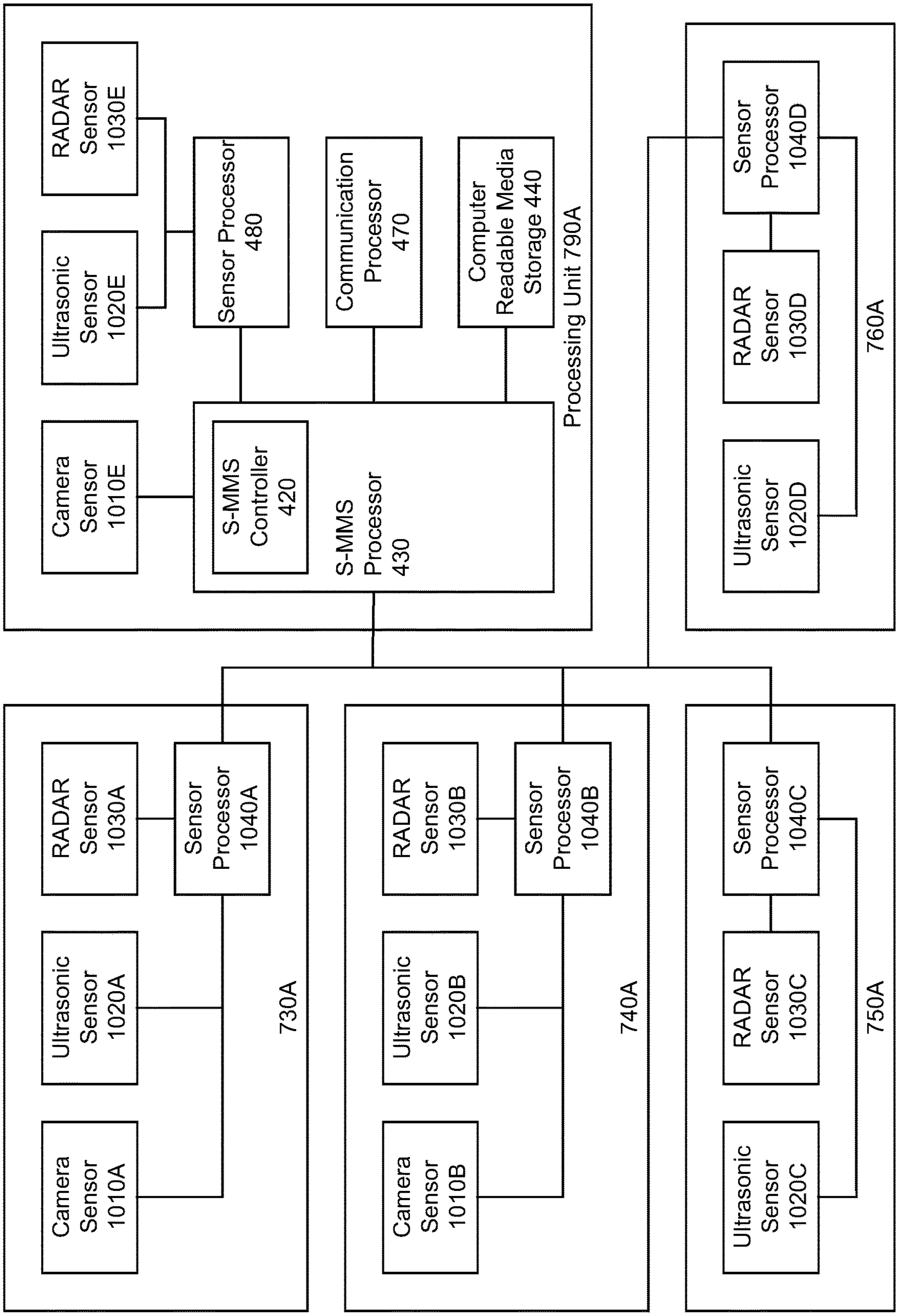
FIG. 10 depicts an example of a partial electrical architecture of the upgrade system of FIG. 9.

FIG. 10 depicts an example of a partial electrical architecture of the upgrade system 902 of FIG. 9. An embodiment of the electrical architecture of a front right sensor module 730A, a front left sensor module 740A, a rear right sensor module 750A, a rear left sensor module 760A, and a processing unit 790A is shown.

The front right sensor module 730A is composed of one or more sensors and one or more sensor processors. In the example embodiment of FIG. 10, one or more camera sensors 1010A, one or more ultrasonic sensors 1020A, one or more RADAR sensors 1030A, and one or more sensor processors 1040A are included in the front right sensor module 730A. The sensor module housing provides a protective enclosure, thermal dissipation, and/or sensor orientation for the front sensor module 730A.

The front left sensor module 740A is composed of one or more sensors and one or more sensor processors. In the example embodiment of FIG. 10, one or more camera sensors 1010B, one or more ultrasonic sensors 1020B, one or more RADAR sensors 1030B, and one or more sensor processors 1040B are included in the front right sensor module 740A. The sensor module housing provides a protective enclosure, thermal dissipation, and/or sensor orientation for the front sensor module 740A.

In the embodiment of FIG. 10, the sensor processors 1040A and 1040B each serve as an edge processing unit or pre-processing unit for the S-MMS controller 420, including for sensor report data and other communications transmitted to the S-MMS controller. The sensor processors 1040A and 1040B have onboard read only memory (ROM), which hosts one or more programs (software) that, when executed by the sensor processor, receive signals and/or data from the one or more sensors of the front sensor modules 730A and 740A (e.g. one or more camera sensors 1010A, 1010B, one or more ultrasonic sensors 1020A, 1020B, and/or one or more RADAR sensors 1030A, 1030B), perform one or more calculations or other processing on the received signals and/or data from the one or more sensors, and output one or more sensor reports or control signals to the S-MMS processor 430 with the results of the one or more calculations or other processing. The processing may include filtering, transforming data to an alternative coordinate system or reference frame, combining data from two or more sensors, gating or down sampling received data, compressing data, and/or calculating one or more outputs based on the received signals and/or data. In an example, the sensor processors 1040A, 1040B of the front sensor modules 730A, 740A use a temporal filter to pre-identify one or more sensor reports that are new before transmitting the sensor reports from the one or more sensors to the S-MMS processor 430 for further processing by the S-MMS controller 420.

The rear right sensor module 750A is composed of one or more sensors and one or more sensor processors. The rear right sensor module 750A includes different sensors than the front sensor modules 730A, 740A due to the coverage needs of the motorized mobile chair 303 and may, in some embodiments, include one or more different sensor processors 1040C. In the example embodiment of FIG. 10, the rear right sensor module 750A is comprised of one or more ultrasonic sensors 1020C, one or more RADAR sensors 1030C, and one or more sensor processors 1040C. The sensor module housing provides a protective enclosure, thermal dissipation, and/or sensor orientation for the rear sensor module 750A.

The rear left sensor module 760A is composed of one or more sensors and one or more sensor processors. The rear left sensor module 760A includes different sensors than the front sensor modules 730A, 740A due to the coverage needs of the motorized mobile chair 303 and may, in some embodiments, include one or more different sensor processors 1040D. In the example embodiment of FIG. 10, the rear left sensor module 760A is comprised of one or more ultrasonic sensors 1020D, one or more RADAR sensors 1030D, and one or more sensor processors 1040D. The sensor module housing provides a protective enclosure, thermal dissipation, and/or sensor orientation for the rear sensor module 760A.

In the embodiment of FIG. 10, the sensor processors 1040C and 1040D each serve as an edge processing unit or pre-processing unit for the S-MMS controller 420, including for sensor report data and other communications transmitted to the S-MMS controller. The sensor processors 1040C and 1040D have onboard read only memory (ROM), which hosts one or more programs (software) that, when executed by the sensor processor, receive signals and/or data from the one or more sensors of the rear sensor modules 750A and 760A (e.g. one or more ultrasonic sensors 1020C, 1020D or one or more RADAR sensors 1030C, 1030D), perform one or more calculations or other processing on the received signals and/or data from the one or more sensors, and output one or more sensor reports or control signals to the S-MMS processor 430 with the results of the one or more calculations or other processing. The processing may include filtering, transforming data to an alternative coordinate system or reference frame, combining data from two or more sensors, gating or down sampling received data, compressing data, and/or calculating one or more outputs based on the received signals and/or data. In an example, the sensor processors 1040C and 1040D of the rear sensor modules 750A, 760A use a temporal filter to pre-identify one or more sensor reports that are new before transmitting the sensor reports from the one or more sensors to the S-MMS processor 430 for further processing by the S-MMS controller 420.

In the embodiment of FIG. 10, the processing unit 790A includes the S-MMS processor 430, computer readable media storage 440, and the communication processor 470. The S-MMS controller 420 is hosted on the S-MMS processor 430. The camera sensor 1010E, which includes a sensor processor, provides one or more sensor reports to the S-MMS processor 430. The ultrasonic sensor 1020E and the RADAR sensor 1030E communicate with the sensor processor 480, which provide one or more sensor reports to the S-MMS processor 430. In this embodiment, the functions of the security processor 450A (FIG. 5) are included in the S-MMS processor 430 and/or communication processor 470 of the processing unit 790A.

Alternate Embodiments

Figure 11:
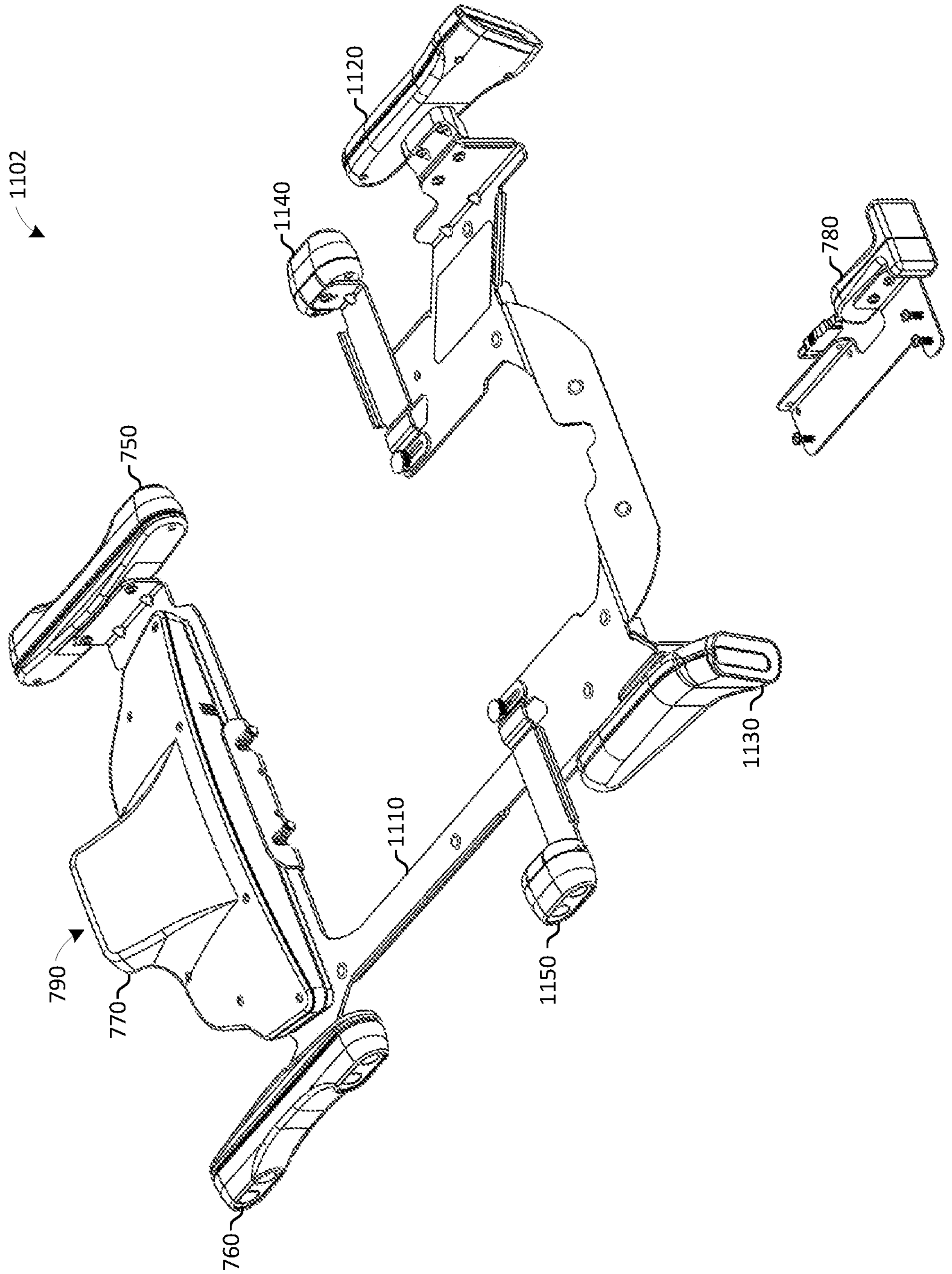
FIG. 11 depicts an embodiment of a frame and sensor modules to upgrade a motorized mobile chair to a smart motorized mobile chair.

FIG. 11 depicts an embodiment of a frame and sensor modules to upgrade a motorized mobile chair to a smart motorized mobile chair. The upgrade system 1102 includes an approximately U-shaped frame 1110 attachable at one or more attachment points of the frame attached substantially horizontally to a structure of a motorized mobile chair 303, such as the base of the motorized mobile chair. Each of the one or more attachment points provides constraint for the upgrade system 1102 frame 1110 such that the frame is located in a fixed position relative to the structure (e.g. base or chassis) of the motorized mobile chair 303. Additionally, the one or more attachment points may be selected to isolate the frame 1110 from strain or deformation in the structure of the motorized mobile chair to which the frame is attached. In one embodiment, the frame 1110 is a unitary structure. In another embodiment, the frame 1110 is a unitary substrate.

The upgrade system 102 further comprises a plurality of object detection sensors, which may be grouped in sensor modules 730, 740, 750, 760, and 770 attached to the frame 1110. An independent sensor module 780 may be attached to the frame 1110, the chassis of the motorized mobile chair 303, or a footrest or other structure of the motorized mobile chair.

At least one processing unit 790, which includes one or more processors (e.g. the processors of FIG. 4 or the upgrade processing system 510 FIG. 5), is attached directly or indirectly to or integrated with the frame 1110. The one or more processors of the processing unit 790 are in communication with the object detection sensors of the sensor modules 730, 740, 750, 760, 770, and 780, such as by wired connections or wireless communication. The processing unit 790 includes and operates the same as the upgrade processing system 512 of FIG. 5. However, in one embodiment, the processing unit 790 also houses the sensor module 770. In another embodiment, the processing unit 790 does not house the sensor module 770 and that sensor module is enclosed in a separate housing that is attachable to either the processing unit 790 or the frame 710.

The upgrade system 1102 optionally includes a second processing unit (e.g. as a part of sensor module 770) configured to collect and combine data from at least one of the plurality of object detection sensors and control signals from the processing unit 790 in order to provide enhanced control signals to the motorized mobile chair base.

The upgrade system 1102 of FIG. 11 is optimized for use with a front wheel drive motorized mobile chair 303. It differs from the embodiment of FIG. 7, which was optimized for a mid-wheel drive motorized mobile chair. The frame 1110 is updated to accommodate the mechanical tire placement and dimensions of the front wheel drive mobile chair. Additionally, the frame 1110 geometry is updated to adjust sensor module placement to provide full sensor coverage for situational awareness given the different vehicle dynamics of a front wheel drive motorized mobile chair versus a mid-wheel drive motorized mobile chair.

In the embodiment of FIG. 11, the rear sensor modules 750, 760, and 770 and the processing unit 790 of the embodiment of FIG. 7 are reused. Additionally, new sensor modules 1120, 1130, 1140, and 1150 are included. The new front right sensor module 1120 and front left sensor module 1130 include an alternative sensor configuration, which in this example includes a camera sensor (also referred to as an imager) and a sensor processor. The mid right sensor module 1140 and mid left sensor module 1150 include an ultrasonic sensor. All of the sensor modules 1120, 1130, 1140, and 1150 transmit one or more sensor reports and/or other control signals to the S-MMS processor 430 of the processor unit 790, which are processed by the S-MMS controller 420 as described above. In an embodiment, one or more sensor modules (e.g. the mid right sensor module 1140 and/or the mid left sensor module 1150) attach to the frame 1110 using one or more locating pins or features and one or more magnets so that the sensor module(s) may break away on impact but then be easily reattached by the user or caregiver at the correct location.

Figure 12:
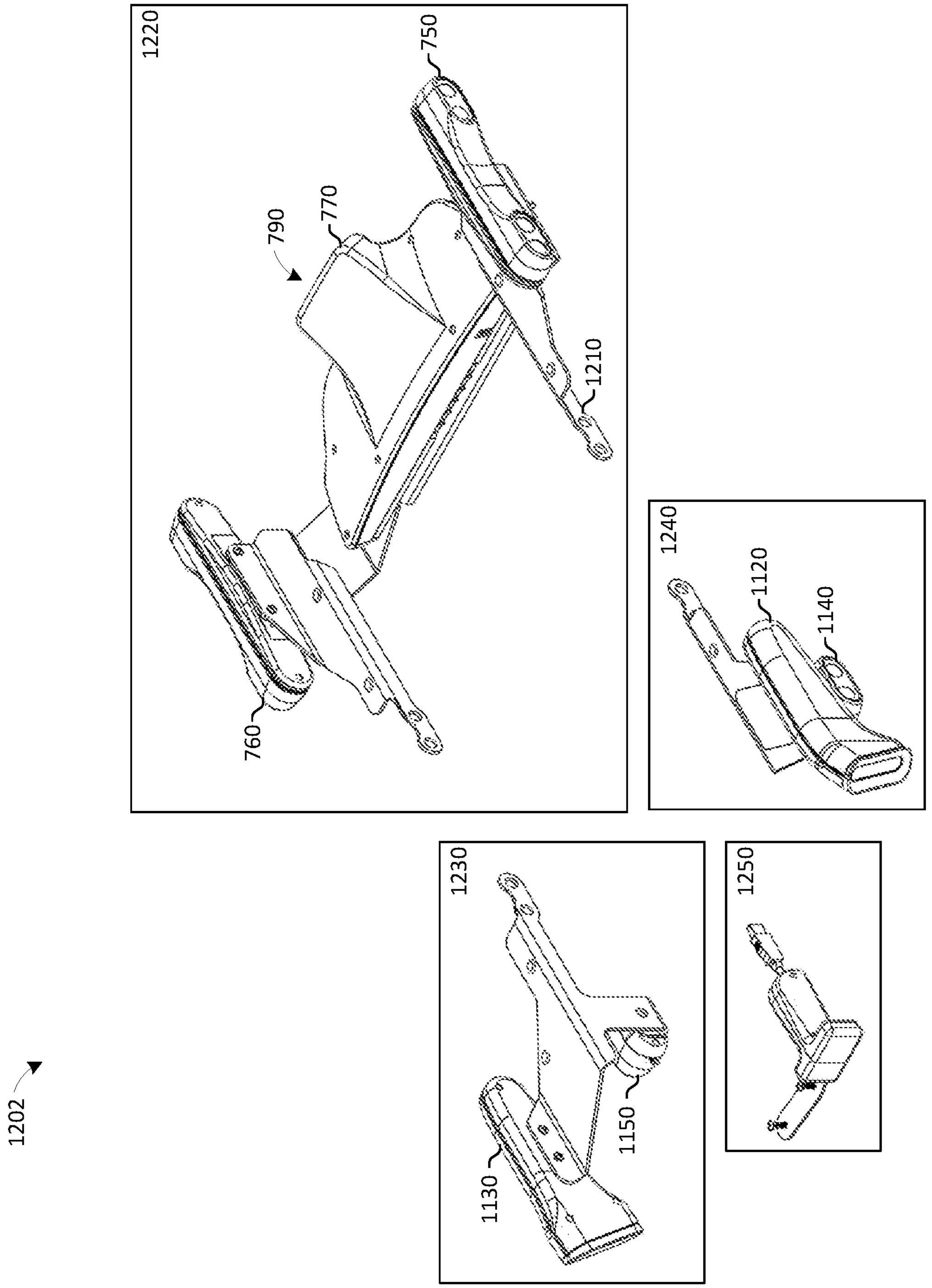
FIG. 12 depicts an embodiment of an upgrade system to upgrade a motorized mobile chair to a smart motorize mobile chair.

FIG. 12 depicts an embodiment of an upgrade system 1202 to upgrade a motorized mobile chair to a smart motorize mobile chair. The upgrade system 1202 includes an approximately U-shaped frame 1210 (e.g. a partial unitary frame) attachable to the base of the motorized mobile chair 303. A plurality of object detection sensor modules (e.g. sensor modules 750, 760, optionally 770, 1120, 1130, 1140, and 1150) attach to the frame 1210 and monitor objects and obstacles within the smart motorized mobile chair proximate environment.

A processing unit 790 attaches to the frame 1210 and collects and processes data from the object detection sensor modules and control signals from the HMI processor 210 in order to provide enhanced control signals to a drive processor 230 or seating processor 240 for navigation and/or seating system control.

The processing unit 790 (e.g. S-MMS processor 430) is configured to receive maneuver instructions from a user via an HMI (e.g. with HMI processor 210) and transmit one or more control signals to one or more processors (e.g. a drive processor 230 or seating processor 240) to maneuver the motorized mobile chair 303 or an accessory to the motorized mobile chair, such as the seating system, in accordance with the one or more control signals from the processing unit.

The frame 1210 is composed of multiple individual parts connected to make a single rigid assembly. In an embodiment, the primary frame assembly 1220 is mounted to the body or chassis of the motorized mobile chair 303. Two additional frame assemblies, a right frame assembly 1230 and a left frame assembly 1240, are similarly mounted to the body or chassis of the motorized mobile chair 303. All three frame assemblies 1220, 1230, and 1240 are rigidly connected to the body or chassis of the motorized mobile chair and move as one rigid unit. In this way, it is possible to use the frame, body, or chassis of the motorized mobile chair as an element of the upgrade system frame structure.

Additionally, one or more independent sensor modules 1250 may be mounted to the body or chassis of the motorized mobile chair 303 or a structure thereof, such as the footrest or other structure. The independent sensor module 1250 may be free to move relative to the frame, body, or chassis of the motorized mobile chair.

Figure 13:
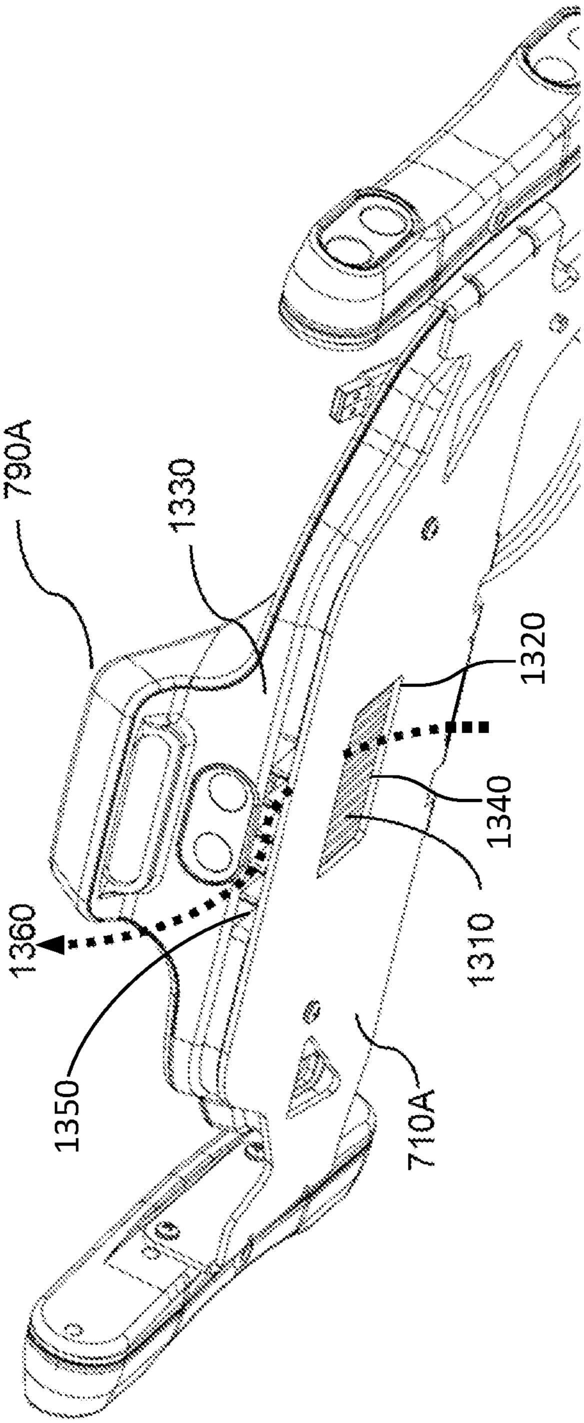
FIG. 13 depicts an embodiment of use of a frame for heat dissipation.

FIG. 13 depicts an embodiment of use of a frame for heat dissipation. In an example, the S-MMS processor 430 of the processing unit 790A mounts to a heat sink 1310 which is sandwiched between an opening 1320 (e.g. rectangular, square, or round opening) in the frame 710A and the S-MMS processor or an enclosure of the S-MMS processing unit 1330. However, there is a space 1340 between the opening 1320 in the frame 710A and the heat sink 1310, and that space leads to an elongated aperture, space, or canal in the frame or an enclosure of the S-MMS processing unit 1330. The frame 710A, or the enclosure of the S-MMS processing unit 1330, also includes a vent 1350 that leads to the elongated aperture, space, or canal. The combination of the vent 1350 on one end of the elongated aperture, space, or canal and the space 1340 between the opening 1320 of the frame and the heat sink 1310 on the other end of the elongated aperture, space, or canal creates an airflow path 1360 which enables airflow to travel from the opening of the frame 1340 over the heat sink 1310 and out of the vent 1350 on the end of the elongated aperture, space, or canal for improved heat dissipation. Additionally or alternatively, the frame 710A or housing of the processing unit 790A may be constructed of a material, such as metal, which provides heat dissipation directly and/or works as a heat sink. In this way, the frame 710A provides low-cost integrated thermal management to the upgrade system.

Figure 14:
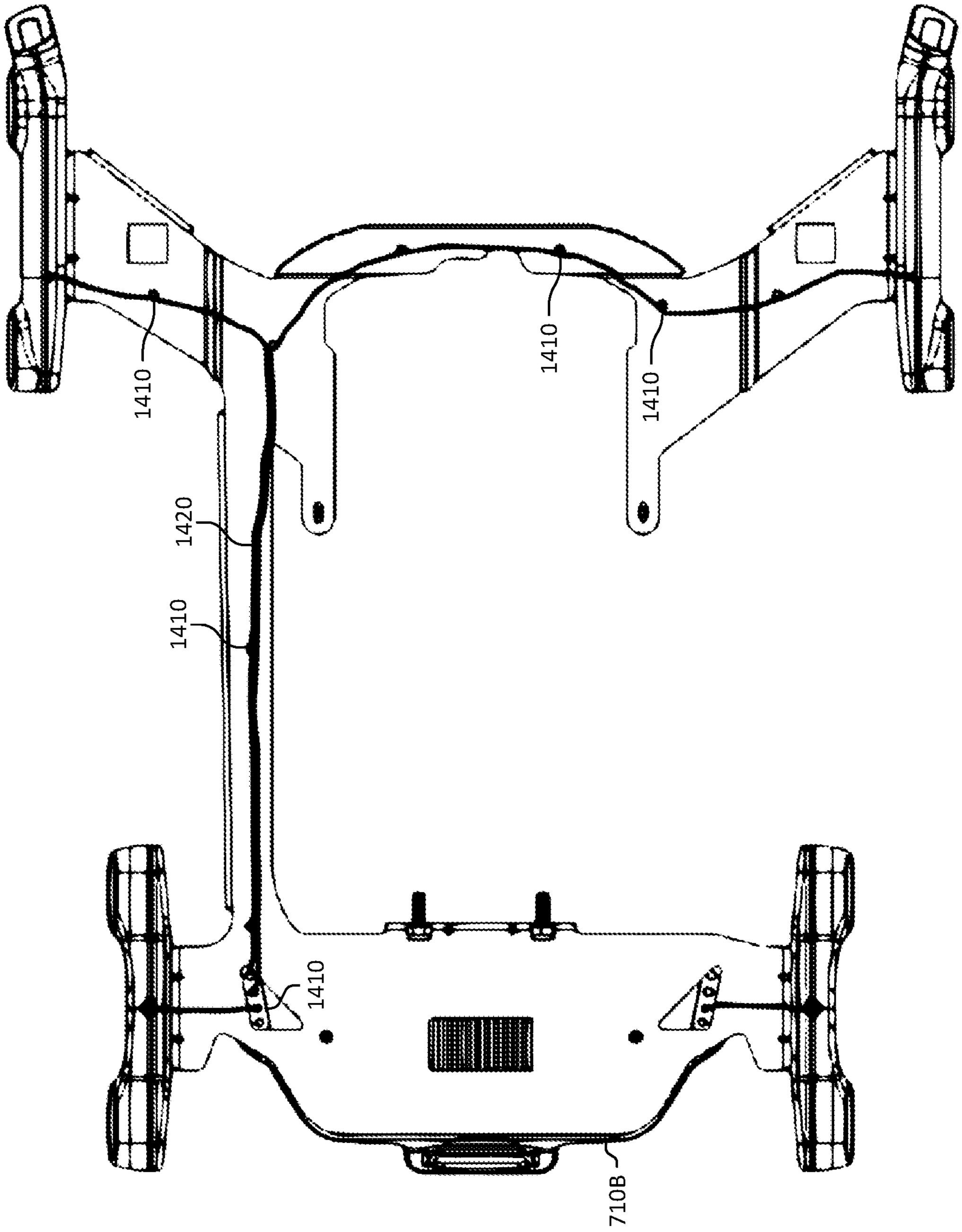
FIG. 14 depicts an embodiment of use of a frame for wire routing and/or signal transmission.

FIG. 14 depicts an embodiment of use of a frame for wire routing and/or signal transmission. In an example, the frame 710B includes one or more features 1410 for routing and/or attaching wires and/or cables 1420 so that the wires and/or cables from one or more sensor modules may be routed efficiently and safely to the processing unit 790. In this way, the frame 710B provides protection and containment for the upgrade system wiring.

In an embodiment, the frame 710B may be manufactured of insulating material (e.g. a non-conductive plastic) or a conductive material specially coated in a non-conductive coating and one or more of the wires 1420 of FIG. 14 may be replaced with conductive traces painted or printed on the frame. In this way the frame 710B of the upgrade system may be used for signal transmission while simplifying or removing the need for the use of cables and/or wires between the sensor modules.

Figure 15:
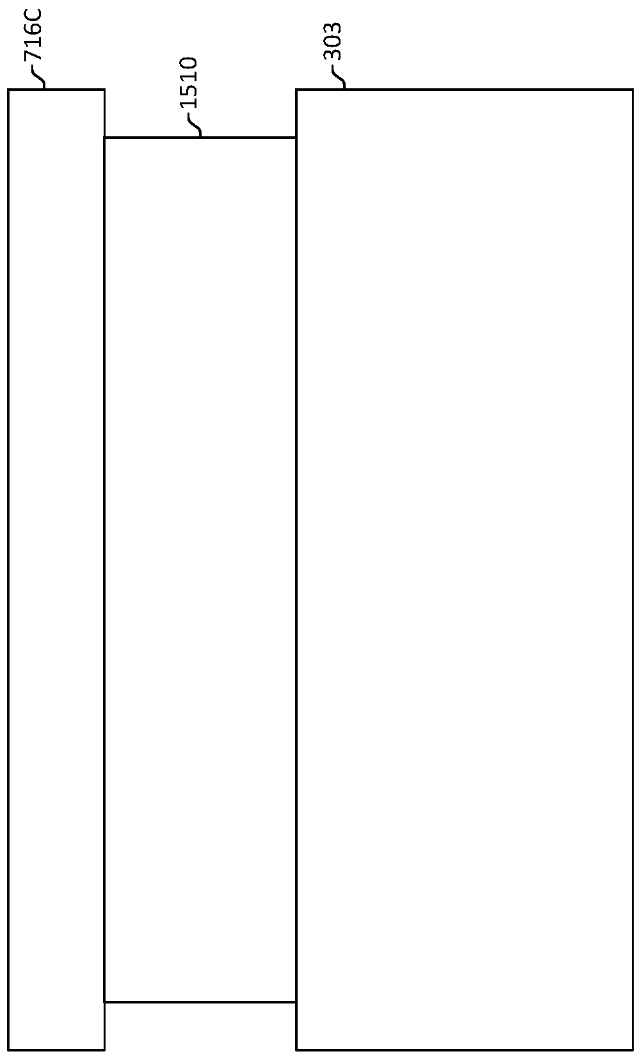
FIG. 15 depicts an embodiment of a vibration damping provision.

FIG. 15 depicts an embodiment of a vibration damping provision 1510 included as part of an upgrade system for a motorized mobile chair 303. In an embodiment, the vibration damping provision 1510 is an elastomeric material (e.g. EPDM foam in an example) which is placed between the frame 710C of an upgrade system for a motorized mobile chair and one or more elements of the motorized mobile chair 303. The vibration damping provision 1510 may be placed uniformly between the frame 710C and the motorized mobile chair frame, body, or chassis or vibration damping provision 1510 may be selectively applied to the frame to or between the frame and the motorized mobile chair frame, body, or chassis to meet the specific damping needs of a particular geometry. Referencing FIG. 9, the foam dampeners 970 may be used as the vibration damping provision 1510 and may only be necessary in specific locations determined experimentally and/or analytically with simulation.

Non-Transitory Computer Readable Medium

The various operations of methods described above may be performed by any suitable means capable of performing the operations, such as various hardware and/or software component(s), circuits, and/or module(s).

The various illustrative logical blocks, modules, and circuits described in connection with the present disclosure may be implemented or performed with a hardware processor, a digital signal processor (DSP), an application specific integrated circuit (ASIC), a field programmable gate array signal (FPGA) or other programmable logic device (PLD), discrete gate or transistor logic, discrete hardware components, or combinations thereof designed to perform the functions described herein. A hardware processor may be a microprocessor, commercially available processor, controller, microcontroller, or state machine. A processor may also be implemented as a combination of two computing components, e.g., a combination of a DSP and a microprocessor, a plurality of microprocessors, one or more microprocessors in conjunction with a DSP core, or any other such configuration.

In one or more aspects, the functions described may be implemented in software, firmware, or any combination thereof executing on a hardware processor. If implemented in software, the functions may be stored as one or more executable instructions or code on a non-transitory computer-readable storage medium. A computer-readable storage media may be any available media that can be accessed by a processor. By way of example, and not limitation, such computer-readable storage media can comprise RAM, ROM, EEPROM, CD-ROM or other optical disk storage, magnetic disk storage or other magnetic storage devices, or any other medium that can be used to store executable instructions or other program code or data structures and that can be accessed by a processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims. Processes or steps described in one implementation can be suitably combined with steps of other described implementations.

Certain aspects of the present disclosure may comprise a computer program product for performing the operations presented herein. For example, such a computer program product may comprise a computer readable storage medium having instructions stored (and/or encoded) thereon, the instructions being executable by one or more processors to perform the operations described herein.

Software or instructions may be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a terminal and/or base station can obtain the various methods upon coupling or providing the storage means to the device.

For the sake of convenience, the operations are described as various interconnected functional blocks or distinct software modules. This is not necessary, however, and there may be cases where these functional blocks or modules are equivalently aggregated into a single logic device, program, or operation with unclear boundaries. In any event, the functional blocks and software modules or described features can be implemented by themselves or in combination with other operations in either hardware or software.

Having described and illustrated the principles of the systems, methods, processes, and/or apparatuses disclosed herein in a preferred embodiment thereof, it should be apparent that the systems, methods, processes, and/or apparatuses may be modified in arrangement and detail without departing from such principles. Claim is made to all modifications and variation coming within the spirit and scope of the following claims.

What is claimed is:

1. A system comprising:

a motorized mobile chair comprising at least a first processor and a second processor;

at least one sensor; and a processing system dividing a communication bus of the motorized mobile chair into a first communication bus and a second communication bus, the processing system comprising:

a first processor to:
receive sensor data from the at least one sensor;
receive a first control signal transmitted from the first processor of the motorized mobile chair, the first control signal comprising data;
modify the data of the first control signal to second data based on at least the sensor data; and
transmit a second control signal with the second data to be received by the second processor of the motorized mobile chair; and
a second processor to:
intercept the first control signal transmitted from the first processor of the motorized mobile chair and addressed for the second processor of the motorized mobile chair;
transmit the first control signal to the first processor of the processing system;
receive the second control signal from the first processor of the processing system; and
transmit the second control signal for reception by the second processor of the motorized mobile chair.

2. The system of claim 1 wherein:
the first processor of the motorized mobile chair comprises a user interface, and the first control signal data comprises at least one user input for at least one first navigation operation of the motorized mobile chair;
the second processor of the motorized mobile chair comprises a drive processor to drive at least one motor of the motorized mobile chair in at least one of a direction and a speed
the sensor data comprises data indicative of a threat to the motorized mobile chair; and
the first processor of the processing system modifies the data of the first control signal to second data for at least one second navigation operation of the motorized mobile chair, either replaces the data with the second data to create the second control signal or generates a new control signal with the second data, and transmits the modified control signal or the new control signal for reception by the drive processor.

3. The system of claim 2 wherein the at least one second navigation operation comprises at least one of a stop, a reduction in speed, an increase in speed, and a turn.

4. The system of claim 2 wherein the at least one second navigation operation comprises at least one of movement of the motorized mobile chair in a second direction and movement of the motorized mobile chair at a second speed.

5. The system of claim 2 wherein the at least one first navigation operation comprises movement of the mobile motorized chair in the at least one of the direction and the speed and the at least one second navigation operation comprises at least one of a stop of the mobile motorized chair, a reduction in speed of the mobile motorized chair, an increase in speed of the mobile motorized chair, and a turn of the mobile motorized chair.

6. The system of claim 2 wherein the threat comprises at least one object in a direction of travel of the motorized mobile chair.

7. The system of claim 2 wherein the threat comprises at least one of an object, a drop, a steep incline, or a steep decline.

8. The system of claim 1 wherein the second processor:
only transmits the first control signal to the first processor of the processing system when the second processor of the processing system determines the first control signal is to be transmitted to the first processor of the processing system.

9. The system of claim 1 wherein:
the at least one sensor comprises a plurality of sensors; and
the first processor:
receives sensor data from the plurality of sensors; and
modifies the data of the first control signal to second data based on at least some of the sensor data from the plurality of sensors.

10. The system of claim 1 wherein modifying the data of the first control signal to the second data based on at least the sensor data comprises creating the second data based on at least the sensor data.

11. The system of claim 1 wherein the second control signal is one of a new control signal or a modified first control signal.

12. The system of claim 1 wherein the first processor of the processing system:
determines, based on the sensor data, there is a threat in a direction of travel of the motorized mobile chair;
modifies the data of the first control signal data to the second data for at least one navigation operation of the motorized mobile chair;
replaces the first control signal data with the second data to create the second control signal; and
transmits the second control signal for reception by the second processor of the motorized mobile chair.

13. The system of claim 1 wherein the first control signal data comprises at least one user input for at least one navigation operation of the motorized mobile chair and the first processor of the processing system:
determines, based on the sensor data, there is a threat to the motorized mobile chair if the at least one navigation operation would be performed by the motorized mobile chair;
modifies the first control signal data to the second data for a second navigation operation of the motorized mobile chair;
replaces the first control signal data with the second data to create the second control signal; and
transmits the second control signal for reception by the second processor of the motorized mobile chair.

14. The system of claim 1 wherein the first communication bus comprises a first control area network (CAN) communication bus and the second communication bus comprises a second CAN communication bus for reception by the second processor of the motorized mobile chair.

15. The system of claim 1 wherein the second processor of the motorized mobile chair comprises at least one of a power processor, a drive processor, and an application processor.

16. The system of claim 1 wherein the first processor of the motorized mobile chair comprises at least one of a processor of a human machine interface and a seating processor.

17. The system of claim 1 wherein:
the first processor of the motorized mobile chair comprises a processor of a human machine interface;
the human machine interface processor receives at least one input, converts the at least one input into data comprising at least one of direction data and speed data, and transmits the first control signal with the data comprising the at least one of direction data and speed data; and the first processor of the processing system modifies the at least one of direction data and speed data based on at least the sensor data to the second data comprising at least one of second direction data and second speed data.

18. The system of claim 1 wherein:
the first processor of the motorized mobile chair comprises a processor of a human machine interface;
the human machine interface processor receives at least one input, converts the at least one input into data comprising at least one of direction data and speed data, and transmits the first control signal with the data comprising the at least one of direction data and speed data as a control area network (CAN) control signal; and
the first processor of the processing system modifies the at least one of direction data and speed data of the CAN control signal based on at least the sensor data to the second data comprising at least one of second direction data and second speed data.

19. The system of claim 1 wherein:
the first processor of the motorized mobile chair comprises a processor of a human machine interface;
the human machine interface processor receives at least one input comprising an X position and a Y position, converts the X position and the Y position into data comprising at least one of direction data and speed data, and transmits the first control signal with the data comprising the at least one of direction data and speed data; and
the first processor of the processing system modifies the at least one of direction data and speed data based on at least the sensor data to the second data comprising at least one of second direction data and second speed data.

20. The system of claim 1 wherein:
the first processor of the motorized mobile chair comprises a processor of a human machine interface;
the human machine interface processor receives at least one input comprising a vector, converts the vector into data comprising at least one of direction data and speed data, and transmits the first control signal with the data comprising the at least one of direction data and speed data; and
the first processor of the processing system modifies the at least one of direction data and speed data based on at least the sensor data to the second data comprising at least one of second direction data and second speed data.

21. The system of claim 1 wherein:
the first processor of the motorized mobile chair comprises a processor of a human machine interface;
the human machine interface processor receives at least one input comprising a first number representing a forward or back input and a second number representing a left or right input, converts the first number and the second number into data comprising at least one of direction data and speed data, and transmits the first control signal with the data comprising the at least one of direction data and speed data; and
the first processor of the processing system modifies the at least one of direction data and speed data based on at least the sensor data to the second data comprising at least one of second direction data and second speed data.

22. The system of claim 1 wherein:
the second processor of the motorized mobile chair comprises a drive processor;
the first processor of the processing system modifies the data of the first control signal to second data for at least one navigation operation of the motorized mobile chair and transmits the second control signal with the second data for reception by the drive processor; and
the drive processor receives the second control signal and causes the motorized mobile chair to perform the at least one navigation operation.

23. The system of claim 1 wherein:
the second processor of the motorized mobile chair comprises a drive processor to drive at least one motor of the motorized mobile chair;
the first processor of the processing system modifies the data of the first control signal to second data for at least one navigation operation of the motorized mobile chair and transmits the second control signal with the second data for reception by the drive processor; and
the drive processor receives the second control signal and causes the at least one motor of the motorized mobile chair to perform the at least one navigation operation.

24. The system of claim 23 wherein the least one navigation operation comprises at least one of a stop of the mobile motorized chair, a reduction in speed of the mobile motorized chair, an increase in speed of the mobile motorized chair, and a turn of the mobile motorized chair.

25. The system of claim 24 wherein the drive processor determines a power to cause the at least one motor of the motorized mobile chair to perform the at least one navigation operation and outputs the determined power to the at least one motor.

26. The system of claim 24 wherein the drive processor determines a power to cause the at least one motor of the motorized mobile chair to perform the at least one navigation operation and outputs another signal identifying the determined power to the at least one motor.

27. The system of claim 1 wherein the at least one sensor comprises at least one of one or more LIDAR sensors, one or more RADAR sensors, one or more SONAR sensors, one or more ultrasonic sensors, one or more infrared sensors, one or more time-of-flight cameras, one or more still image capturing sensors, one or more video cameras, one or more computer vision sensors, one or more orientation sensors, and one or more position sensors.

28. The system of claim 1 wherein the first control signal and the second control signal are formatted with at least one of a destination device identification, an originating device identification, a message type, and a message identifier.

29. The system of claim 1 wherein the first control signal and the second control signal each comprises at least one of a calculation, a logical comparison, a change in state, an adjustment of an operating parameter, a limitation of a feature or capability, and an enablement of a feature or capability.

30. The system of claim 1 wherein the first control signal and the second control signal each comprises at least one of a wired signal and a wireless signal, and wherein the control signal further comprises at least one of a digital signal and an analog signal.

31. The system of claim 1 wherein the first control signal and the second control signal each comprises at least one of a digital signal and an analog signal.

32. A method to operate a motorized mobile chair, the method comprising:

connecting a processing system between a first processor of a motorized mobile chair and the second processor of the motorized mobile chair intercepting, at a first processor of a processor system, sensor data from at least one sensor;

receiving, at the first processor of the processor system, a first control signal transmitted from the first processor of the motorized mobile chair, the first control signal comprising data;

modifying the data of the first control signal based on at least the sensor data; and transmitting the second control signal to be received by the second processor of the motorized mobile chair;

receiving, at a second processor of the processor system, the first control signal transmitted from the first processor of the motorized mobile chair;

determining, at the second processor of the processor system, when the first control signal is to be transmitted to the first processor of the processing system;

transmitting the first control signal to the first processor of the processing system when the second processor of the processing system determines the first control signal is to be transmitted to the first processor of the processing system;

receiving a second control signal from the first processor of the processing system; and transmitting the second control signal for reception by the second processor of the motorized mobile chair.

33. The method of claim 32, further comprising:

determining, at the second processor of the processing system, the first control signal is to be transmitted to the first processor of the processing system when the first control signal has at least one of a particular message type or a particular message identifier.

34. The method of claim 32 further comprising:

transmitting, from the second processor of the processing system, the first control signal for reception by the second processor of the motorized mobile chair when the second processor of the processing system determines the first control signal is not to be transmitted to the first processor of the processing system.

35. The method of claim 32 further comprising:

determining, by the second processor of the processing system, to not transmit the first control signal to the first processor of the processing system and transmits the first control signal for reception by the second processor of the motorized mobile chair when the second processor of the processing system determines the first control signal is not to be transmitted to the first processor of the processing system.

36. The method of claim 32 further comprising:

determining, by the second processor of the processing system, the first control signal is to be transmitted to the first processor of the processing system when the first control signal has at least one of a message type normally processed by the first processor of the processing system or a message identifier normally processed by the first processor of the processing system.

37. The method of claim 32 further comprising:

determining, by the second processor of the processing system, the first control signal is to be transmitted to the first processor of the processing system when the first control signal has at least one of a message type for which the second processor of the processing system is programmed to act or a message identifier for which the second processor of the processing system is programmed to act.

* * * * *